United States Patent
Kanada et al.

(10) Patent No.: US 11,876,267 B2
(45) Date of Patent: Jan. 16, 2024

(54) ELECTROLYTE MEMBRANE FOR REDOX FLOW BATTERY, REDOX FLOW BATTERY, AND METHOD FOR PRODUCING ELECTROLYTE MEMBRANE

(71) Applicant: ASAHI KASEI KABUSHIKI KAISHA, Tokyo (JP)

(72) Inventors: Yuka Kanada, Tokyo (JP); Junya Yamashita, Tokyo (JP); Hiroko Kamochi, Tokyo (JP); Kazuya Kai, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 212 days.

(21) Appl. No.: 17/436,466

(22) PCT Filed: Mar. 6, 2020

(86) PCT No.: PCT/JP2020/009762
§ 371 (c)(1),
(2) Date: Sep. 3, 2021

(87) PCT Pub. No.: WO2020/184455
PCT Pub. Date: Sep. 17, 2020

(65) Prior Publication Data
US 2022/0045345 A1    Feb. 10, 2022

(30) Foreign Application Priority Data

Mar. 8, 2019 (JP) ................... 2019-042876
Sep. 13, 2019 (JP) ................... 2019-167421

(51) Int. Cl.
*H01M 8/1025* (2016.01)
*H01M 4/96* (2006.01)
(Continued)

(52) U.S. Cl.
CPC .......... *H01M 8/1025* (2013.01); *H01M 4/96* (2013.01); *H01M 8/109* (2013.01);
(Continued)

(58) Field of Classification Search
CPC .... H01M 4/96; H01M 8/1025; H01M 8/1039; H01M 8/1067; H01M 8/109; H01M 8/188
See application file for complete search history.

(56) References Cited

U.S. PATENT DOCUMENTS

2004/0097603 A1    5/2004   Hasegawa et al.
2008/0292964 A1    11/2008  Kazacos et al.
(Continued)

FOREIGN PATENT DOCUMENTS

JP    2008-544444 A    12/2008
JP    2013-168365 A    8/2013
(Continued)

OTHER PUBLICATIONS

Evgeny A. Karpushkin et al., "Effect of biaxial stretching on the ion-conducting properties of Nafion membranes", Mendeleev Communications, 2016, 26, pp. 117-118.
(Continued)

*Primary Examiner* — Karie O'Neill Apicella
(74) *Attorney, Agent, or Firm* — GREENBLUM & BERNSTEIN, P.L.C.

(57) ABSTRACT

The present invention provides an electrolyte membrane for a redox flow battery, comprising a perfluorocarbon polymer having an ion-exchange group, wherein the perfluorocarbon polymer has equivalent weight EW of the ion-exchange group of 600 g/eq or more and 2000 g/eq or less, a craze area ratio of the electrolyte membrane is 1.5% or less, and a relative dimension of the electrolyte membrane in at least one of a X direction and a Y direction is 80% or more and
(Continued)

less than 100% in the following relative dimension by dipping in 2 M aqueous sulfuric acid solution.

20 Claims, 4 Drawing Sheets

(51) Int. Cl.
    *H01M 8/1039*     (2016.01)
    *H01M 8/1067*     (2016.01)
    *H01M 8/1086*     (2016.01)
    *H01M 8/18*         (2006.01)

(52) U.S. Cl.
    CPC ....... *H01M 8/1039* (2013.01); *H01M 8/1067* (2013.01); *H01M 8/188* (2013.01)

(56) References Cited

U.S. PATENT DOCUMENTS

| | | |
|---|---|---|
| 2013/0252137 A1 | 9/2013 | Zhang et al. |
| 2014/0255821 A1 | 9/2014 | Katayama et al. |
| 2014/0370404 A1 | 12/2014 | Kato et al. |
| 2014/0377687 A1 | 12/2014 | Miyake et al. |
| 2016/0126579 A1 | 5/2016 | Darling et al. |
| 2016/0204459 A1 | 7/2016 | Henkensmeier et al. |
| 2016/0322662 A1 | 11/2016 | Schmitz et al. |
| 2018/0351192 A1 | 12/2018 | Lee et al. |
| 2019/0367676 A1 | 12/2019 | Kanada et al. |

FOREIGN PATENT DOCUMENTS

| | | |
|---|---|---|
| JP | 2014-503946 A | 2/2014 |
| JP | 2014-135144 A | 7/2014 |
| JP | 2016-524280 A | 8/2016 |
| JP | 6016197 B2 | 10/2016 |
| JP | 2016-191006 A | 11/2016 |
| JP | 2017-503054 A | 1/2017 |
| JP | 2017-030806 A | 2/2017 |
| WO | 2002/062879 A1 | 8/2002 |
| WO | 2013/100083 A1 | 7/2013 |
| WO | 2016/006075 A1 | 1/2016 |
| WO | 2018/155598 | 8/2018 |

OTHER PUBLICATIONS

ISR issued in WIPO Patent Application No. PCT/JP2020/009762, Jun. 2, 2020, English translation.

IPRP issued WIPO Patent Application No. PCT/JP2020/009762, Aug. 25, 2021, English translation.

Melchior Jan-Patrick et al, "About the Interactions Controlling Nafion's Viscoelastic Properties and Morphology", Macromolecules, vol. 48, No. 23, 2015, pp. 8534-8545, XP055916467.

Karpushkin Evgeny A et al, "Effect of biaxial stretching on the ion-conducting properties of Nafion membranes", Mendeleev Communications, Institute of Physics Publishing, vol. 26, No. 2, 2016, pp. 117-118, XP029492548.

So Soonyong et al, "Hydrophilic Channel Alignment of Perfluoronated Sulfonic-Acid Ionomers for Vanadium Redox Flow Batteries", Applied Materials & Interfaces, vol. 10, No. 23, 2018, pp. 19689-19696, XP055849202.

Supplementary European Search Report dated May 10, 2022 for EP Application No. 20770727.4.

Nicolas Fedelich: "Application Handbook Thermal Analysis of Polymers Selected Applications Thermal Analysis", Jan. 1, 2013 (Jan. 1, 2013), XP055608279, Retrieved from the Internet: URL:https://www.mt.com/dam/LabDiV/guides-glen/ta-polymer/TA_Polymers_Selected_Apps_En.pdf [retrieved on Jul. 24, 2019].

(b)

ELECTROLYTE MEMBRANE FOR REDOX FLOW BATTERY, REDOX FLOW BATTERY, AND METHOD FOR PRODUCING ELECTROLYTE MEMBRANE

TECHNICAL FIELD

The present invention relates to an electrolyte membrane for a redox flow battery, a redox flow battery, and a method for producing an electrolyte membrane.

BACKGROUND ART

As the introduction of renewable energy such as solar power generation or wind power generation has advanced in recent years, the output of the renewable energy fluctuates depending on weather or time. Hence, the installation of large-scale storage batteries is required for absorbing the output fluctuation and stabilizing electric power.

Redox flow batteries, one of the high-capacity storage batteries, have received attention from the viewpoint of long service lives and recyclable electrolyte solutions. The redox flow battery has a cell structure where a membrane is installed between a positive electrode and a negative electrode, and performs charge and discharge by supplying an electrolyte solution to each of a positive electrode chamber and a negative electrode chamber. The electrolyte solution is generally an acidic solution, and a metal ion whose valence varies through oxidation-reduction is used as an active material. The membrane used is generally an electrolyte membrane having a function of permitting permeation of a proton in the electrolyte solution, and blocking active material ions present in a positive electrode cell and a negative electrode cell. However, depending on the types or valences of the active material ions, the membrane has insufficient blocking properties, which in turn allow the active material ions to pass through the membrane and diffuse, resulting in reduction in battery capacity or reduction in current efficiency.

A vanadium ion-type electrolyte solution has been developed from long ago as the active material for use in the electrolyte solution, because of advantages such as high solubility, reaction rate, and electromotive force. In the case of a vanadium-type electrolyte solution, an electrolyte membrane of a perfluorocarbon polymer having high oxidation resistance is generally used as a membrane that comes into contact with the electrolyte solution, because pentavalent vanadium present in the electrolyte solution has high oxidative power.

For example, Patent Literature 1 describes a fluorine-type ion-exchange membrane having a film thickness of 1 to 500 µm, a reduced puncture strength of 300 g or more, and a heat shrinkage ratio of 45% or less in air of 160° C.

CITATION LIST

Patent Literature

Patent Literature 1: International Publication No. WO 2002/062879

Non Patent Literature

Non Patent Literature 1: Mendeleev Communications 2016, Vol. 26, P. 117-P. 118

SUMMARY OF INVENTION

Technical Problem

For redox flow batteries, higher performance is desired, and decrease in resistance and improvement in permeating ion selectivity for blocking ions are expected from the viewpoint of a membrane. A general approach of reduction in resistance includes a method of thinning a membrane. However, such a thinned membrane is in a tradeoff relationship with permeating ion selectivity and disadvantageously increases self-discharge for use as a battery.

An electrolyte membrane of a perfluorocarbon polymer generally used swells upon contact with an electrolyte solution, causing change in dimension. Hence, the electrolyte membrane is incorporated in a dry state into a redox flow battery, and the electrolyte membrane swells and undergoes a deflection within a cell when the battery is filled with an electrolyte solution. This disadvantageously reduces battery performance or, in some cases, cracks the membrane.

Patent Literature 1 discloses that the drawing of an electrolyte membrane improves mechanical strength and exhibits performance excellent in dimensional stability and ion conductivity. However, the performance is characteristics in an environment of usage of fuel batteries. This literature does not disclose problems associated with performance in an environment in which the electrolyte membrane swells in an electrolyte solution in a temperature region close to room temperature, as in redox flow batteries, the suppression of permeation of an active material in the electrolyte solution, and swelling during cell assembly.

Non Patent Literature 1 discloses that the adjustment of a draw ratio and a heating temperature of an electrolyte membrane suppresses the ion permeation of an active material vanadium while reducing resistance. However, this drawing increases the self-discharge of a formed redox flow battery according to the disclosure.

An object of the present invention is to provide an electrolyte membrane for a redox flow battery, a redox flow battery, and a method for producing an electrolyte membrane, which suppress self-discharge and exhibit excellent battery performance.

Solution to Problem

The present inventors have conducted diligent studies on a method for attaining the object, and completed the electrolyte membrane of the present invention by finding that the object can be attained by setting a relative dimension of an electrolyte membrane by dipping in a 2 M aqueous sulfuric acid solution, or a relative dimension of an electrolyte membrane by dipping in distilled water, and an area ratio of a region where a visible light transmittance falls below a given value due to the occurrence of a craze, to predetermined ranges.

Specifically, the present invention is as follows.

[1]

An electrolyte membrane for a redox flow battery, comprising a perfluorocarbon polymer having an ion-exchange group, wherein the perfluorocarbon polymer has equivalent weight EW of the ion-exchange group of 600 g/eq or more and 2000 g/eq or less, a craze area ratio of the electrolyte membrane is 1.5% or less, and a relative dimension of the electrolyte membrane in at least one of a X direction and a Y direction is 80% or more and less than 100% in the following relative dimension by dipping in 2 M aqueous sulfuric acid solution:

<Relative Dimension by Dipping in 2 M Aqueous Sulfuric Acid Solution> an electrolyte membrane for testing having a water content of 1% or less is prepared; the electrolyte membrane for testing is dipped in a 2 M aqueous sulfuric acid solution at 25° C. for 30 minutes; and ratios of change in dimension in a X direction on a surface of the electrolyte membrane for testing and a Y direction orthogonal to the X direction are calculated according to the following expression:

Relative dimension (%)={(Dimension in a specific direction after the dipping)/(Dimension in the specific direction before the dipping)}×100.

[2]

An electrolyte membrane for a redox flow battery, comprising a perfluorocarbon polymer having an ion-exchange group, wherein the perfluorocarbon polymer has equivalent weight EW of the ion-exchange group of 600 g/eq or more and 2000 g/eq or less, a craze area ratio of the electrolyte membrane is 1.5% or less, and a relative dimension of the electrolyte membrane in at least one of a X direction and a Y direction is 80% or more and less than 100%, and a relative dimension thereof in a Z direction is 115% or more, in the following relative dimension by dipping in distilled water:

<Relative Dimension by Dipping in Distilled Water> an electrolyte membrane for testing having a water content of 1% or less is prepared; the electrolyte membrane for testing is dipped in distilled water at 25° C. for 30 minutes; and ratios of change in dimension in a X direction on a surface of the electrolyte membrane for testing, a Y direction orthogonal to the X direction, and a Z direction orthogonal to the X direction and the Y direction are calculated:

Relative dimension (%)={(Dimension in a specific direction after the dipping)/(Dimension in the specific direction before the dipping)}×100.

[3]

The electrolyte membrane according to [1] or [2], wherein the perfluorocarbon polymer has a structure represented by the following formula (1):

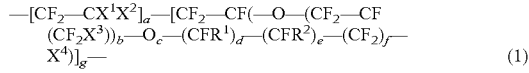
$$-[CF_2-CX^1X^2]_a-[CF_2-CF(-O-(CF_2-CF(CF_2X^3))_b-O_c-(CFR^1)_d-(CFR^2)_e-(CF_2)_f-X^4)]_g- \quad (1)$$

wherein $X^1$, $X^2$ and $X^3$ are each independently a halogen atom or a perfluoroalkyl group having 1 to 3 carbon atoms; $X^4$ is a —COOZ group, a —SO$_3$Z group, a —PO$_3$Z$_2$ group or a —PO$_3$HZ group; Z is a hydrogen atom, an alkali metal atom, an alkaline earth metal atom, NH$_4$, NH$_3$R$^{11}$, NH$_2$R$^{11}$R$^{12}$, NHR$^{11}$R$^{12}$R$^{13}$, or NR$^{11}$R$^{12}$R$^{13}$R$^{14}$; R$^{11}$, R$^{12}$, R$^{13}$, and R$^{14}$ are each independently an alkyl group or an aryl group; R$^1$ and R$^2$ are each independently a halogen atom, a perfluoroalkyl group having 1 to 10 carbon atoms or a fluorochloroalkyl group having 1 to 10 carbon atoms; a and g are numbers satisfying 0≤a<1, 0<g≤1, and a+g=1; b is an integer of 0 to 8; c is 0 or 1; and d, e and f are each independently an integer of 0 to 6, provided that d, e and f are not 0 at the same time.

[4]

The electrolyte membrane according to any one of [1] to [3], wherein the perfluorocarbon polymer has a structure represented by the following formula (2):

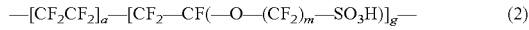
$$-[CF_2CF_2]_a-[CF_2-CF(-O-(CF_2)_m-SO_3H)]_g- \quad (2)$$

wherein a and g are numbers satisfying 0≤a<1, 0<g≤1, and a+g=1; and m is an integer of 1 to 6.

[5]

The electrolyte membrane according to any of [1] to [4], wherein an ion cluster size of the electrolyte membrane in the thickness direction measured by small-angle X-ray scattering is 3.0 nm or larger.

[6]

The electrolyte membrane according to any of [1] to [5], wherein peak intensity of a long period of crystals measured by small-angle X-ray scattering in the electrolyte membrane is 0.5 or less.

[7]

The electrolyte membrane according to any of [1] to [6], wherein at least one surface of the electrolyte membrane is covered with an anion-exchange compound.

[8]

The electrolyte membrane according to [7], wherein the anion-exchange compound has a tertiary amino group or a quaternary ammonium group.

[9]

A redox flow battery comprising an electrolyzer, the electrolyzer comprising: a positive electrode cell chamber comprising a positive electrode consisting of a carbon electrode; a negative electrode cell chamber comprising a negative electrode consisting of a carbon electrode; and an electrolyte membrane as a membrane that separates the positive electrode cell chamber and the negative electrode cell chamber, wherein the positive electrode cell chamber comprises a positive electrode electrolyte solution comprising an active material, the negative electrode cell chamber comprises a negative electrode electrolyte solution comprising an active material, and the electrolyte membrane is an electrolyte membrane according to any of [1] to [8].

[10]

The redox flow battery according to [9], wherein the positive electrode electrolyte solution and the negative electrode electrolyte solution comprise a vanadium ion.

[11]

The redox flow battery according to [9] or [10], wherein the carbon electrode has a continuous void, the carbon electrode has fibrous carbon, and the fibrous carbon has an average fiber diameter of 0.1 to 5.0 μm.

[12]

The redox flow battery according to [11], wherein the carbon electrode has a three-dimensionally continuous carbon structure.

[13]

The redox flow battery according to [11] or [12], wherein the carbon electrode is a carbon foam having linear portions and node portions connecting the linear portions.

[14]

The redox flow battery according to [13], wherein the ratio of the number of the linear portions to the number of the node portions in the carbon foam is 1.2 or more and 1.7 or less.

[15]

The redox flow battery according to [13] or [14], wherein a density of the node portions in at least a portion of the carbon foam is 15,000 portions/mm³ or more.

[16]

A method for producing an electrolyte membrane for a redox flow battery, comprising the step of drawing a raw material membrane containing a perfluorocarbon polymer having an ion-exchange group, wherein the perfluorocarbon polymer has equivalent weight EW of the ion-exchange group of 600 g/eq or more and 2000 g/eq or less, a craze area ratio of the electrolyte membrane is 1.5% or less, and a relative dimension of the electrolyte membrane in at least one of a X direction and a Y direction is 80% or more and less than 100% in the following relative dimension by dipping in 2 M aqueous sulfuric acid solution:

<Relative Dimension by Dipping in 2 M Aqueous Sulfuric Acid Solution> an electrolyte membrane for testing having a water content of 1% or less is prepared; the electrolyte membrane for testing is dipped in a 2 M aqueous sulfuric acid solution at 25° C. for 30 minutes; and ratios of change in dimension in a X direction on a surface of the electrolyte membrane for testing and a Y direction orthogonal to the X direction are calculated according to the following expression:

Relative dimension (%)={(Dimension in a specific direction after the dipping)/(Dimension in the specific direction before the dipping)}×100.

[17]

A method for producing an electrolyte membrane for a redox flow battery, comprising the step of drawing a raw material membrane containing a perfluorocarbon polymer having an ion-exchange group under heating, wherein the perfluorocarbon polymer has equivalent weight EW of the ion-exchange group of 600 g/eq or more and 2000 g/eq or less, a craze area ratio of the electrolyte membrane is 1.5% or less, and a relative dimension of the electrolyte membrane in at least one of a X direction and a Y direction is 80% or more and less than 100%, and a relative dimension thereof in a Z direction is 115% or more, in the following relative dimension by dipping in distilled water:

<Relative Dimension by Dipping in Distilled Water> an electrolyte membrane for testing having a water content of 1% or less is prepared; the electrolyte membrane for testing is dipped in distilled water at 25° C. for 30 minutes; and ratios of change in dimension in a X direction on a surface of the electrolyte membrane for testing, a Y direction orthogonal to the X direction, and a Z direction orthogonal to the X direction and the Y direction are calculated:

Relative dimension (%)={(Dimension in a specific direction after the dipping)/(Dimension in the specific direction before the dipping)}×100.

[18]

The method for producing an electrolyte membrane according to [16] or [17], further comprising the step of performing relaxation treatment in a cooling process after the drawing step.

[19]

The method for producing an electrolyte membrane according to [18], further comprising the step of performing heat treatment for 1 minute or longer and 30 minutes or shorter under a condition equal to or higher than a glass transition temperature and equal to or lower than a temperature higher by 100° C. than the glass transition temperature with the obtained membrane constrained after the relaxation treatment step.

Advantageous Effects of Invention

The present invention can provide an electrolyte membrane for a redox flow battery, a redox flow battery, and a method for producing an electrolyte membrane, which suppress self-discharge and exhibit excellent battery performance.

DESCRIPTION OF EMBODIMENTS

Figure 1:
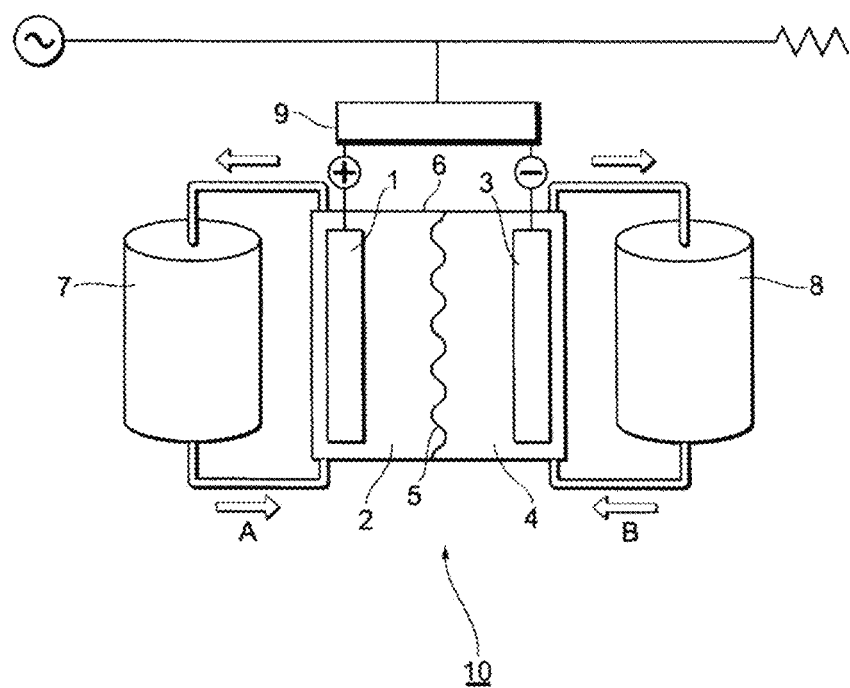
FIG. 1 shows one example of a schematic view of a redox flow battery comprising the electrolyte membrane for a redox flow battery according to the present embodiment.

Hereinafter, the mode for carrying out the present invention (hereinafter, referred to as the "present embodiment") will be described in detail. However, the present invention is not limited by the description given below and can be carried out through various changes or modification made without departing from the spirit of the present invention.

[Electrolyte Membrane for Redox Flow Battery]

The electrolyte membrane of the present embodiment is an electrolyte membrane for a redox flow battery, comprising a perfluorocarbon polymer having an ion-exchange group.

The perfluorocarbon polymer has equivalent weight EW of the ion-exchange group of 600 g/eq or more and 2000 g/eq or less.

A craze area ratio of the electrolyte membrane of the present embodiment is 1.5% or less.

In the first embodiment, a relative dimension of the electrolyte membrane in at least one of a X direction and a Y direction is 80% or more and less than 100% in the following relative dimension by dipping in 2 M aqueous sulfuric acid solution:

<Relative Dimension by Dipping in 2 M Aqueous Sulfuric Acid Solution> an electrolyte membrane for testing having a water content of 1% or less is prepared; the electrolyte membrane for testing is dipped in a 2 M aqueous sulfuric acid solution at 25° C. for 30 minutes; and ratios of change in dimension in a X direction on a surface of the electrolyte membrane for testing and a Y direction orthogonal to the X direction are calculated according to the following expression:

Relative dimension (%)={(Dimension in a specific direction after the dipping)/(Dimension in the specific direction before the dipping)}×100.

In the second embodiment, a relative dimension of the electrolyte membrane in at least one of a X direction and a Y direction is 80% or more and less than 100%, and a relative dimension thereof in a Z direction is 115% or more, in the following relative dimension by dipping in distilled water:

<Relative Dimension by Dipping in Distilled Water> an electrolyte membrane for testing having a water content of 1% or less is prepared; the electrolyte membrane for testing is dipped in distilled water at 25° C. for 30 minutes; and ratios of change in dimension in a X direction on a surface of the electrolyte membrane for testing, a Y direction orthogonal to the X direction, and a Z direction orthogonal to the X direction and the Y direction are calculated:

Relative dimension (%)={(Dimension in a specific direction after the dipping)/(Dimension in the specific direction before the dipping)}×100.

The configuration described above can provide an electrolyte membrane for a redox flow battery which suppresses self-discharge. The configuration described above is further capable of suppressing a deflection of the membrane and can lengthen the service life of the membrane for use as an electrolyte membrane for a redox flow battery, from another viewpoint.

The electrolyte membrane according to the present embodiment configured as mentioned above is excellent in durability with few cracks within the electrolyte membrane even after repetitive use.

<Perfluorocarbon Polymer>

The electrolyte membrane of the present embodiment contains a perfluorocarbon polymer having an ion-exchange group.

Examples of the ion-exchange group include, but are not particularly limited to, a —COOH group, a —SO$_3$H group, a —PO$_3$H$_2$ group and their salts. Examples of the salt include, but are not particularly limited to, alkali metal salts, alkaline earth metal salts, and amine salts.

(Equivalent Weight EW)

The perfluorocarbon polymer has equivalent weight EW of the ion-exchange group of 600 g/eq or more and 2000 g/eq or less from the viewpoint of suppressing the permeation of an active material ion and improving current efficiency and from the viewpoint of improving proton conductivity and reducing resistance.

The equivalent weight EW of the perfluorocarbon polymer used in the present embodiment is 600 g/eq or more, preferably 700 g/eq or more, more preferably 800 g/eq or more, further preferably 900 g/eq or more, from the viewpoint of suppressing the permeation of an active material ion and improving current efficiency. The equivalent weight EW of the perfluorocarbon polymer used in the present embodiment is 2000 g/eq or less, preferably 1700 g/eq or less, more preferably 1500 g/eq or less, further preferably 1200 g/eq or less, from the viewpoint of improving proton conductivity and reducing resistance.

The equivalent weight EW means the dry mass (g) of the perfluorocarbon polymer per equivalent of the ion-exchange group.

The equivalent weight EW of the perfluorocarbon polymer can be measured by substituting the perfluorocarbon polymer with a salt, and back-titrating the solution against an alkali solution.

The equivalent weight EW can be adjusted by the copolymerization ratio of a fluorine-type monomer which is a starting material of the perfluorocarbon polymer, a selected monomer species, etc.

The perfluorocarbon polymer preferably has a structure represented by the following formula (1):

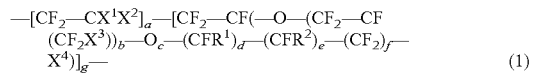

$$—[CF_2—CX^1X^2]_a—[CF_2—CF(—O—(CF_2—CF(CF_2X^3))_b—O_c—(CFR^1)_d—(CFR^2)_e—(CF_2)_f—X^4)]_g— \quad (1)$$

$X^1$, $X^2$, $X^3$, $R^1$, $R^2$ and a to g in the formula (1) are each defined as follows.

$X^1$, $X^2$ and $X^3$ are each independently a halogen atom or a perfluoroalkyl group having 1 to 3 carbon atoms.

Examples of the halogen atom include, but are not particularly limited to, a fluorine atom, a chlorine atom, a bromine atom, and an iodine atom. Examples of the perfluoroalkyl group having 1 to 3 carbon atoms include, but are not particularly limited to, a trifluoromethyl group, a pentafluoroethyl group, a perfluoro-n-propyl group, and a perfluoroisopropyl group.

$X^1$, $X^2$ and $X^3$ are each independently preferably a fluorine atom or a perfluoroalkyl group having 1 to 3 carbon atoms, more preferably a fluorine atom, from the viewpoint of the chemical stability, such as oxidative degradation resistance, of the polymer.

$X^4$ is a —COOZ group, a —SO$_3$Z group, a —PO$_3$Z$_2$ group or a —PO$_3$HZ group.

Z is a hydrogen atom, an alkali metal atom, an alkaline earth metal atom, NH$_4$, NH$_3$R$^{11}$, NH$_2$R$^{11}$R$^{12}$, NHR$^{11}$R$^{12}$R$^{13}$, or NR$^{11}$R$^{12}$R$^{13}$R$^{14}$.

In this context, $R^{11}$, $R^{12}$, $R^{13}$ and $R^{14}$ are each independently an alkyl group or an aryl group. The alkyl group represented by $R^{11}$, $R^{12}$, $R^{13}$ or $R^{14}$ is preferably an alkyl group having 1 to 6 carbon atoms, more preferably a methyl group, an ethyl group, a n-propyl group, an isopropyl group, a n-butyl group, a sec-butyl group, an isobutyl group, or a n-hexyl group. Examples of the aryl group include, but are not particularly limited to, a phenyl group and a naphthyl group.

When $X^4$ is a —PO$_3$Z$_2$ group, the Z moieties may be the same or different. Examples of the alkali metal atom include, but are not particularly limited to, a lithium atom, a sodium atom, and a potassium atom. Examples of the alkaline earth metal atom include, but are not particularly limited to, a calcium atom and a magnesium atom. $X^4$ is preferably SO$_3$Z from the viewpoint of the chemical stability, such as oxidative degradation resistance, of the polymer.

$R^1$ and $R^2$ are each independently a halogen atom, a perfluoroalkyl group having 1 to 10 carbon atoms or a fluorochloroalkyl group. In this context, Examples of the halogen atom represented by $R^1$ or $R^2$ include, but are not particularly limited to, a fluorine atom, a chlorine atom, a bromine atom, an iodine atom. Among them, a fluorine atom is preferred.

a and g are numbers satisfying 0≤a<1, 0<g≤1, and a+g=1. b is an integer of 0 to 8. c is 0 or 1. d, e and f are each independently an integer of 0 to 6. However, d, e and f are not 0 at the same time.

The order of arrangement of the structural unit of [CF$_2$—CX$^1$X$^2$] and the structural unit of [CF$_2$—CF(—O—(CF$_2$—CF(CF$_2$X$^3$))$_b$—O$_c$—(CFR$^1$)$_d$—(CFR$^2$)$_e$—(CF$_2$)$_f$—X$^4$)] is not particularly limited and may be random or may be a block.

The perfluorocarbon polymer according to the present embodiment is preferably perfluorocarbon sulfonic acid resin (hereinafter, also referred to as "PFSA resin") because the advantageous effects of the present embodiment tend to be more marked. The PFSA resin according to the present embodiment is a resin in which perfluorocarbon as a side chain and one or two or more sulfonic acid groups (optionally, some of which may be in the form of a salt) per side chain are bonded to the backbone consisting of a PTFE skeletal chain.

The PFSA resin preferably contains a repeat unit represented by $-[CF_2CF_2]-$ and a repeat unit derived from a compound represented by the following formula (3), (4-1) or (4-2):

$$CF_2=CF(-O-(CF_2CFXO)_n\text{-}[A]) \quad (3)$$

wherein X is F or a perfluoroalkyl group having 1 to 3 carbon atoms, n is an integer of 0 to 5, [A] is $(CF_2)_m-SO_3H$, and m is an integer of 0 to 6, provided that n and m are not 0 at the same time, $$CF_2=CF-O-(CF_2)_P-CFX(-O-(CF_2)_K-SO_3H) \quad (4\text{-}1)$$

$$CF_2=CF-O-(CF_2)_P-CFX(-(CF_2)_L(CF_2)_m-SO_3H) \quad (4\text{-}2)$$

wherein X is a perfluoroalkyl group having 1 to 3 carbon atoms, P is an integer of 0 to 12, K is an integer of 1 to 5, L is an integer of 1 to 5, and m is an integer of 0 to 6, provided that K and L are the same or different and P, K, and L are not 0 at the same time.

The PFSA resin is more preferably a copolymer comprising a repeat unit represented by $-[CF_2CF_2]-$ and a repeat unit represented by $-[CF_2-CF(-O-(CF_2CFXO)_n-(CF_2)_m-SO_3H)]-$ (wherein X is F or $CF_3$, n is an integer of 0 to 5, and m is an integer of 0 to 12, provided that n and m are not 0 at the same time), the copolymer comprising at least one repeat unit represented by $-[CF_2-CF(-O-(CF_2CFXO)_n-(CF_2)_m-SO_3H)]-$ (wherein X is $CF_3$, n is 0 or 1, and m is an integer of 0 to 12, provided that n and m are not 0 at the same time). When the PFSA resin is a copolymer having the structure and has the predetermined equivalent weight EW, the resulting electrolyte membrane tends to have sufficient hydrophilicity and have strong resistance to an electrolyte solution active material, for example, pentavalent vanadium.

When the PFSA resin comprises the repeat unit represented by $-[CF_2-CF(-O-(CF_2CFXO)_n-(CF_2)_m-SO_3H)]-$ (wherein n is 0, and m is an integer of 1 to 6), or both the repeat units of $-[CF_2-CF(-O-(CF_2)_P-CFX(-O-(CF_2)_K-SO_3H))]-$ and $-[CF_2-CFX(-O-(CF_2)_P-CFX(-(CF_2)_L-O-(CF_2)_m-SO_3H))]-$ derived from the compound represented by the formula (4-1) and the compound represented by the formula (4-2), respectively, the resulting electrolyte membrane tends to have high hydrophilicity because of a low equivalent weight (EW).

The perfluorocarbon polymer represented by the formula (1) according to the present embodiment more preferably has a structure represented by the following formula (2) because the advantageous effects of the present embodiment tend to be more marked:

$$[CF_2CF_2]_a-[CF_2-CF(-O-(CF_2)_m-SO_3H)]_g- \quad (2)$$

In the formula (2), a and g are numbers satisfying $0 \le a < 1$, $0 < g \le 1$, and $a+g=1$, and m is an integer of 1 to 6.

The perfluorocarbon polymer according to the present embodiment is not particularly limited as long as the perfluorocarbon polymer has the structure represented by the formula (1) or the formula (2). The perfluorocarbon polymer may have an additional structure.

The perfluorocarbon polymer according to the present embodiment may be subjected to intermolecular partial cross-linking reaction directly or indirectly through the ion-exchange group, from the viewpoint of controlling solubility or swellability. The partial cross-linking thus performed can reduce the water solubility (improve the water resistance) of the perfluorocarbon polymer, for example, even if the equivalent weight EW of the perfluorocarbon polymer is on the order of 500 g/eq.

When the perfluorocarbon polymer has a low melt flow value (has a high molecular weight), the partial cross-linking can also reduce solubility or excessive swellability by increasing intermolecular entanglement.

Examples of the partial cross-linking reaction include the reaction of the ion-exchange group with a functional group or the backbone of another molecule, the reaction between ion-exchange groups, and cross-linking reaction (covalent bond) via an oxidation-resistant low-molecular compound, oligomer or high-molecular substance, etc. In some cases, the partial cross-linking reaction may be reaction with a salt (including an ion bond with a $-SO_3H$ group)-forming substance. Examples of the oxidation-resistant low-molecular compound, oligomer or high-molecular substance include polyhydric alcohols and organic diamines.

The molecular weight of the perfluorocarbon polymer according to the present embodiment is not particularly limited and is preferably 0.05 g/10 min or more and 50 g/10 min or less, more preferably 0.1 g/10 min or more and 30 g/10 min or less, further preferably 0.5 g/10 min or more and 20 g/10 min or less, in terms of the value of melt flow index (MFI) measured in accordance with ASTM: D1238 (measurement conditions: temperature: 270° C., load: 2160 g).

(Method for Producing Perfluorocarbon Polymer)

The perfluorocarbon polymer according to the present embodiment can be obtained, for example, but not particularly limited to, by producing a precursor of the perfluorocarbon polymer having an ion-exchange group (hereinafter, also referred to as a "resin precursor"), followed by hydrolysis treatment thereof.

The PFSA resin is obtained, for example, by hydrolyzing a PFSA resin precursor consisting of a copolymer of a vinyl ether fluoride compound represented by the following formula (6) or (7) and an olefin fluoride monomer represented by the following formula (8).

$$CF_2=CF-O-(CF_2CFXO)_n\text{-}A \quad (6)$$

wherein X is F or a perfluoroalkyl group having 1 to 3 carbon atoms, n is an integer of 0 to 5, A is $(CF_2)_m-W$ wherein m is an integer of 0 to 6, n and m are not 0 at the same time, and W is a functional group capable of being converted to a $-SO_3H$ group by hydrolysis.

$$CF_2=CF-O-(CF_2)_P-CFX(-O-(CF_2)_K-W) \text{ or}$$
$$CF_2=CF-O-(CF_2)P-CFX(-(CF_2)_L-O-(CF_2)_m-W) \quad (7)$$

wherein X is a perfluoroalkyl group having 1 to 3 carbon atoms, P is an integer of 0 to 12, K is an integer of 1 to 5, L is an integer of 1 to 5 wherein L, K and m are not 0 at the same time, m is an integer of 0 to 6, and W is a functional group capable of being converted to a $-SO_3H$ group by hydrolysis.

$$CF_2=CFZ \quad (8)$$

wherein Z is H, Cl, F, a perfluoroalkyl group having 1 to 3 carbon atoms, or a cyclic perfluoroalkyl group optionally containing oxygen as a ring-constituting atom.

Examples of W in the formula (6) and the formula (7) include, but are not particularly limited to, a $-SO_2F$ group, a $-SO_2Cl$ group, and a $-SO_2Br$ group. In the formula (6) and the formula (7), preferably, X is $CF_3$, and W is $-SO_2F$ group. In the formula (8), Z is preferably F. Among others, n=0, m=an integer of 1 to 6, X=$CF_3$, W=a-$SO_2F$ group, and Z=F are more preferred because a solution having high hydrophilicity and a high resin concentration tends to be obtained.

The resin precursor according to the present embodiment can be synthesized by an approach known in the art. The resin precursor can be produced, for example, by polymerizing a vinyl fluoride compound having a group capable of being converted to an ion-exchange group ($X^4$ in the formula (1)) (ion-exchange group precursor group) by hydrolysis or the like, and olefin fluoride such as tetrafluoroethylene (hereinafter, also referred to as "TFE") in the presence of a radical-generating agent such as a peroxide. Examples of the polymerization method that can be used include, but are not particularly limited to, a polymerization method of adding and dissolving the vinyl fluoride compound and a gas of the olefin fluoride in a polymerization solvent such as fluorine-containing hydrocarbon, followed by reaction (solution polymerization), a polymerization method of using the vinyl fluoride compound itself as a polymerization solvent without the use of a solvent such as fluorine-containing hydrocarbon (bulk polymerization), a polymerization method of adding the vinyl fluoride compound and a gas of the olefin fluoride to an aqueous solution of a surfactant as a medium, followed by reaction (emulsion polymerization), a polymerization method of adding and emulsifying the vinyl fluoride compound and a gas of the olefin fluoride in an aqueous solution of a surfactant and an emulsification aid such as an alcohol, followed by reaction (emulsion polymerization), and a polymerization method of adding and suspending the vinyl fluoride compound and a gas of the olefin fluoride in an aqueous solution of a suspension stabilizer, followed by reaction (suspension polymerization).

The resin precursor according to the present embodiment can be prepared by any of the polymerization methods mentioned above for use. Alternatively, a block or tapered polymer obtained by adjusting polymerization conditions such as the amount of TFE gas supplied may be used as the resin precursor.

The resin precursor may have a fluorinated moiety of an impure end or a structurally easy-to-oxidize moiety (a CO group, a H bond moiety, etc.) generated in the molecular structure of the resin during polymerization reaction, through treatment with fluorine gas by a method known in the art.

In the resin precursor, some ion-exchange group precursor groups (e.g., —$SO_2F$ groups) may be partially (including intermolecularly) imidized (alkyl-imidized, etc.).

The molecular weight of the resin precursor is not particularly limited and is preferably 0.05 g/10 min or more and 50 g/10 min or less, more preferably 0.1 g/10 min or more and 30 g/10 min or less, further preferably 0.5 g/10 min or more and 20 g/10 min or less, in terms of the value of melt flow index (MFI) of the precursor measured in accordance with ASTM: D1238 (measurement conditions: temperature: 270° C., load: 2160 g).

The shape of the resin precursor is not particularly limited and is preferably, for example, 0.5 $cm^3$ or smaller pellets, a dispersion, or powder particles from the viewpoint of accelerating the treatment rates of hydrolysis treatment and acid treatment mentioned later. Among others, a powder after polymerization is more preferably used. A membrane-shaped resin precursor obtained by extrusion molding may be used from the viewpoint of cost.

The method for producing the perfluorocarbon polymer according to the present embodiment from the resin precursor is not particularly limited and is, for example, a method of extrusion-molding the resin precursor through a nozzle or a die, etc., using an extruder, followed by hydrolysis treatment, or subjecting a polymerization product itself, i.e., a dispersion, or a precipitated or filtered powder thereof to hydrolysis treatment.

Specifically, the resin precursor obtained as described above and, if necessary, molded can subsequently be dipped in a basic reaction liquid and subjected to hydrolysis treatment. Examples of the basic reaction liquid for use in hydrolysis treatment include, but are not particularly limited to, aqueous solutions of amine compounds such as dimethylamine, diethylamine, monomethylamine and monoethylamine, and aqueous solutions of hydroxides of alkali metals or alkaline earth metals. Among them, an aqueous solution of sodium hydroxide or potassium hydroxide is preferred. In the case of using a hydroxide of an alkali metal or an alkaline earth metal, its content is not particularly limited and is preferably 10% by mass or more and 30% by mass or less with respect to the whole reaction liquid. The reaction liquid more preferably further contains a swellable organic compound such as methyl alcohol, ethyl alcohol, acetone or dimethyl sulfoxide (DMSO). The content of the swellable organic compound is preferably 1% by mass or more and 30% by mass or less with respect to the whole reaction liquid.

The resin precursor thus subjected to hydrolysis treatment in a basic reaction liquid is thoroughly washed with water such as hot water, followed by acid treatment. Examples of the acid for use in acid treatment include, but are not particularly limited to, mineral acids such as hydrochloric acid, sulfuric acid, and nitric acid, and organic acids such as oxalic acid, acetic acid, formic acid, and trifluoroacetic acid. A mixture of such an acid and water is preferred. These acids may each be used singly, or two or more thereof may be used in combination. The basic reaction liquid used in hydrolysis treatment may be removed in advance by treatment with a cation-exchange resin or the like before acid treatment.

The acid treatment protonates the ion-exchange group precursor group of the resin precursor to generate an ion-exchange group. In the case of, for example, a resin precursor produced according to the formula (6), W in the formula (6) is protonated into a —$SO_3H$ group by the acid treatment. The perfluorocarbon polymer obtained by hydrolysis and acid treatment becomes dispersible or soluble in a protic organic solvent or water, or a mixed solvent thereof and can be prepared into a suspension or a solution.

The perfluorocarbon polymer may contain an alkali metal, an alkaline earth metal, or any other radical-degradable transition metal (a Ce compound, a Mn compound, etc.) in the form of a partial salt therewith (on the order of 0.01 to 5% of the total equivalent of ion-exchange groups) or in a form used singly or in combination with a basic polymer mentioned later.

The electrolyte membrane of the present embodiment preferably comprises a mixture of two or more types of perfluorocarbon polymers each having an ion-exchange group and differing in monomer structure, from the viewpoint of more favorable electric resistance and mechanical strength.

The two or more types of perfluorocarbon polymers thus mixed are capable of exhibiting excellent characteristics in which their respective functions are integrated.

For mixing the two or more types of perfluorocarbon polymers, the ratio of a polymer having higher equivalent weight EW is preferably larger than 50% by mass, more preferably larger than 55% by mass, further preferably larger than 60% by mass, from the viewpoint of more favorable mechanical strength. The polymer having higher equivalent weight EW tends to have higher crystalline nature and therefore tends to exert higher mechanical strength at the above ratio.

(Method for Producing Raw Material Membrane of Perfluorocarbon Polymer)

The raw material membrane for use in the production of the electrolyte membrane of the present embodiment is obtained by processing the precursor resin or the perfluorocarbon polymer into a film by a method known in the art. For example, a method can be used which involves melt-kneading the precursor of the perfluorocarbon polymer mentioned above, and then forming a film using an extruder, followed by hydrolysis to form an ion-exchange group. Alternatively, the perfluorocarbon polymer may be temporarily dispersed in a solvent, and a film can then be formed on a base material by cast film production.

(Method for Drawing Raw Material Membrane of Perfluorocarbon Polymer)

The method for producing an electrolyte membrane according to the present embodiment comprises the step of drawing a raw material membrane under heating.

The production method of the present embodiment further comprises the step of performing relaxation treatment in a cooling process after the drawing step.

Specifically, the self-discharge of the electrolyte membrane of the present embodiment is suppressed without crazes by drawing under heating and cooling at a relaxation ratio of preferably 0.1% or more and 5.0% or less.

The drawing treatment of the present embodiment can be performed by, for example, uniaxial drawing, simultaneous biaxial drawing, or sequential biaxial drawing.

In the present embodiment, the X-axis direction refers to a machine direction (MD) when a long membrane is produced by extrusion film production, cast film production, or the like, and the Y-axis direction refers to a direction orthogonal to MD (TD).

The draw ratio is preferably 1.5, more preferably 1.8, further preferably 2.1, still further preferably 2.5, at least in a uniaxial direction from the viewpoint of suppressing a deflection of the membrane incorporated in a cell. The draw ratio is preferably 8 or less, more preferably 6 or less, further preferably 5 or less, still further preferably 4 or less, from the viewpoint of preventing crazes and improving permeating ion selectivity. The draw ratio according to the present embodiment can be set to draw ratios in the X-axis direction and the Y-axis direction each independently. An area draw ratio obtained by multiplying the draw ratio in the X-axis direction and the draw ratio in the Y-axis direction is preferably 2.2 or more, more preferably 3.2 or more, further preferably 4.0 or more, from the viewpoint of improving permeating ion selectivity. The area draw ratio is preferably 50 or less, more preferably 40 or less, further preferably 30 or less, from the viewpoint of preventing crazes.

Biaxial drawing is preferably performed from the viewpoint of controlling the cluster size of the electrolyte membrane and further improving the selective permeability of ions. Specifically, the electrolyte membrane of the present embodiment is preferably a biaxially drawn electrolyte membrane. In the present embodiment, a membrane of the perfluorocarbon polymer having an ion-exchange group is first subjected to simultaneous biaxial drawing in a temperature range from a temperature lower by 20° C. to a temperature higher by 40° C. than the α dispersion temperature of the polymer.

The α dispersion temperature of the membrane of the perfluorocarbon polymer having an ion-exchange group is a temperature at which the backbone of the polymer is considered to start thermal motion, which is measured in a dynamic viscoelastic measurement apparatus. For example, the α dispersion temperature of a polymer such as nylon is generally much higher than room temperature. Therefore, the thermal motion of the backbone can be greatly decreased by cooling to a temperature equal to or lower than the α dispersion temperature after the completion of drawing. This can effectively stabilize drawing orientation.

When the ion-exchange group is, for example, a sulfonic acid group, the α dispersion temperature of the perfluorocarbon polymer is around 110 to 140° C. Accordingly, supposing that the α dispersion temperature is 140° C., the drawing temperature in the drawing step is set from a temperature region of 120° C. or higher and 180° C. or lower.

A feature of the present embodiment is that the membrane drawn by the drawing step is subsequently heat-treated at a temperature higher than the drawing temperature with the membrane fixed.

The fixation of the membrane means that the periphery of the membrane is fixed so as not to relax the orientation of the drawn membrane, and specifically, can be a state in which the ends of the membrane are fixed. The ends of the electrolyte membrane can be fixed using an apparatus such as a chuck-type tenter.

The drawing rate in the drawing treatment is preferably 10 mm/min or more, more preferably 50 mm/min or more, further preferably 90 mm/min or more, from the viewpoint of suppressing orientational relaxation. On the other hand, the drawing rate is preferably 500 mm/min or less, more preferably 300 m/min or less, further preferably 200 m/min or less, from the viewpoint of suppressing break.

The method for producing an electrolyte membrane according to the present embodiment preferably further comprises the step of performing relaxation treatment in a cooling process after the drawing treatment.

The relaxation treatment after the drawing treatment according to the present embodiment is achieved by narrowing an inter-chuck distance by a predetermined distance. The ratio of the narrowed distance to the inter-chuck distance (relaxation ratio) is preferably 0.1% or more, more preferably 0.2% or more, further preferably 0.4% or more, from the viewpoint of suppressing break. On the other hand, the relaxation ratio is preferably 3% or less, more preferably 2% or less, further preferably 1.5% or less, from the viewpoint of suppressing orientational relaxation. As a result, a membrane drawn without causing minute defects in the membrane can be obtained by relaxing stress ascribable to shrinkage during cooling. The resulting electrolyte membrane can have excellent permeating ion selectivity even if the electrolyte membrane swells in an electrolyte solution in a formed redox flow battery.

The method for producing an electrolyte membrane according to the present embodiment preferably further comprises the step of performing heat treatment for 1 minute or longer and 30 minutes or shorter under a condition equal to or higher than a glass transition temperature and equal to or lower than a temperature higher by 100° C. than the glass transition temperature with the obtained membrane constrained after the relaxation treatment step.

The temperature of the heat treatment step is preferably 80° C. or higher and 200° C. or lower, more preferably 90° C. or higher and 180° C. or lower, further preferably 90° C. or higher and 160° C. or lower. The heat treatment time is preferably 1 minute or longer and 20 minutes or shorter, more preferably 1 minute or longer and 15 minutes or shorter.

(Flatness)

The flatness index of the electrolyte membrane of according to the present embodiment is preferably less than 1.2, more preferably less than 1.1, further preferably less than 1.05, from the viewpoint of favorable workability upon assembly of a redox flow battery. The flatness index of the electrolyte membrane is the ratio of a length along a membrane surface to the projected dimension of the membrane. A specific measurement method is as described in Examples. The flatness index of the electrolyte membrane can satisfy the above numeric value on an arbitrary surface and can preferably satisfy the above numeric value on an arbitrary cut out surface of 140 mm square.

(Craze Area Ratio)

The craze area ratio of the electrolyte membrane according to the present embodiment is 1.5% or less from the viewpoint of suppressing self-discharge.

The craze area ratio is preferably 1.3% or less, more preferably 1.0% or less, further preferably 0.8% or less, from the viewpoint of suppressing self-discharge. The craze area ratio is preferably, for example, 0.0% or more, and is more preferably 0.1% or more, further preferably 0.2% or more, from the viewpoint of enhancing puncture strength.

The craze area means the ratio of the area of a region having a transmittance of 10% or less to the total area of the electrolyte membrane. The craze area can be determined by measuring a visible light transmittance distribution within an electrolyte membrane surface and more specifically, can be measured by a method shown in Examples.

(Orientation Parameter)

The orientation parameter of the present embodiment is preferably 0.05 or more, more preferably 0.15 or more, further preferably 0.20 or more, on either a membrane surface (intra-membrane-surface) or a surface perpendicular to the membrane surface (extra-membrane-surface) from the viewpoint of permeating ion selectivity. The upper limit of the orientation parameter is not particularly limited and is preferably 0.70 or less, more preferably 0.60 or less, further preferably 0.50 or less, from the viewpoint of preventing membrane strength from being reduced due to the occurrence of crazes.

The orientation parameter of the surface perpendicular to the membrane surface (hereinafter, also referred to as an "extra-membrane-surface orientation parameter") is preferably 0.15 or more, more preferably 0.20 or more, further preferably 0.25 or more, from the viewpoint of suppressing self-discharge. The upper limit of the orientation parameter of the surface perpendicular to the membrane surface is not particularly limited and is preferably 0.70 or less, more preferably 0.60 or less, further preferably 0.50 or less.

A cluster shape in the film thickness direction is controlled by orienting the electrolyte membrane under specific conditions such that the orientation parameter falls within the above range. The membrane is formed by suppressing crazes, which are fine defects in the membrane. As a result, the permeation of an ion such as a vanadium ion and an electrolyte solution can be effectively suppressed without suppressing proton movement.

Intra-membrane-surface or extra-membrane-surface orientation parameter q can be determined by approximating azimuthal intensity distribution $I(\phi)$ of a peak derived from an ion cluster in small-angle X-ray scattering mentioned later using an orientation function represented by the following expression:

$$I(\phi) = Q \frac{1-q^2}{1+q^2-2q\cos\phi}$$

In this context, Q is a constant, $\phi$ is an azimuth, and q is an orientation parameter.

(Ion Cluster Size)

The ion cluster size of the present embodiment can be measured by small-angle X-ray scattering (SAXS) in a membrane surface direction and a direction perpendicular to the membrane surface.

The ion cluster size in the membrane surface direction is preferably 2.5 nm or larger, more preferably 2.7 nm or larger, further preferably 2.8 nm or larger, from the viewpoint of reducing a resistance component in a formed redox flow battery. The ion cluster size in the membrane surface direction is preferably 3.9 nm or smaller, more preferably 3.5 nm or smaller, further preferably 3.2 nm or smaller, from the viewpoint of suppressing the permeation of an active material in an electrolyte solution and improving current efficiency.

The ion cluster size in the direction perpendicular to the membrane surface (hereinafter, referred to as an "ion cluster size in the extra-membrane-surface direction") is preferably 3.0 nm or larger, more preferably 3.3 nm or larger, further preferably 3.4 nm or larger, from the viewpoint of improving permeating ion selectivity. The ion cluster size in the extra-membrane-surface direction is not particularly limited and is preferably 3.9 nm or smaller, more preferably 3.7 nm or smaller, further preferably 3.6 nm or smaller.

(Long Period of Crystals)

The long period of crystals of the electrolyte membrane according to the present embodiment measured by small-angle X-ray scattering is determined according to the Bragg's equation from the position of a peak derived from the periodicity of difference in electron density between crystals and amorphous matter, which appears in the scattering vector range of 0.1 to 1.0 $nm^{-1}$ in small-angle X-ray scattering.

The long period of crystals measured by small-angle X-ray scattering is preferably 5 nm or larger and 60 nm or smaller, more preferably 10 nm or larger and 55 nm or smaller, further preferably 20 nm or larger and 50 nm or smaller, still further preferably 30 nm or larger and 50 nm or smaller.

The peak intensity of the long period of crystals measured by small-angle X-ray scattering is defined as the ratio of difference between peak top intensity and baseline intensity to the baseline intensity of a peak of the long period of crystals appearing in the scattering vector range of 0.1 to 1.0 $nm^{-1}$ in small-angle X-ray scattering. The peak intensity is preferably 0.5 or less, more preferably 0.3 or less, further preferably 0.2 or less, still further preferably 0.1 or less, from the viewpoint of improving current efficiency.

As for the film thickness of the raw material membrane for use in drawing treatment in the present embodiment, a membrane having a thickness calculated according to the targeted draw ratio can be used.

The thickness of the electrolyte membrane of the present embodiment is preferably 1 μm or larger, more preferably 3 μm or larger, further preferably 5 μm or larger, from the viewpoint of the handleability of the membrane. The thickness of the electrolyte membrane is preferably 500 μm or smaller, more preferably 300 μm or smaller, further preferably 100 μm or smaller, still further preferably 70 μm or smaller, even further preferably 40 µm or smaller, from the viewpoint of cell resistance for use as a redox flow battery.

The electrolyte membrane of the present embodiment is suitably used as a membrane in a redox flow battery. In general, an electrolyte membrane constituted by a perfluorocarbon polymer having an ion-exchange group swells upon contact with an aqueous solution such as an electrolyte solution, an aqueous sulfuric acid solution or distilled water, causing change in dimension. The electrolyte membrane of the present embodiment is prevented from swelling even by contact with such an aqueous solution, and its change in dimension in the membrane surface direction is suppressed. Hence, the electrolyte membrane is used, without swelling in advance, in assembling a cell of a redox flow battery, and the membrane undergoes no deflection and can be used without reducing battery performance when the battery is filled with an electrolyte solution.

(Relative Dimension by Dipping in 2 M Aqueous Sulfuric Acid Solution)

The relative dimension of the electrolyte membrane of the present embodiment in at least one of a X direction and a Y direction is 80% or more and less than 100% in terms of a relative dimension by dipping in a 2 M aqueous sulfuric acid solution from the viewpoint of neither causing a deflection in a cell of a redox flow battery nor reducing battery performance.

<Relative Dimension by Dipping in 2 M Aqueous Sulfuric Acid Solution> an electrolyte membrane for testing having a water content of 1% or less is prepared; the electrolyte membrane for testing is dipped in a 2 M aqueous sulfuric acid solution at 25° C. for 30 minutes; and ratios of change in dimension in a X direction on a surface of the electrolyte membrane for testing and a Y direction orthogonal to the X direction are calculated according to the following expression:

Relative dimension (%)={(Dimension in a specific direction after the dipping)/(Dimension in the specific direction before the dipping)}×100.

The relative dimension of the electrolyte membrane of the present embodiment in at least one of a X direction and a Y direction is preferably 99.8% or less, more preferably 99.5% or less, further preferably 99.2% or less, still further preferably 99.0% or less, in terms of the relative dimension in a 2 M aqueous sulfuric acid solution from the viewpoint of neither causing a deflection in a cell of a redox flow battery nor reducing battery performance. The relative dimension in at least one of a X direction and a Y direction is preferably 85% or more, more preferably 90% or more, further preferably 95.0% or more, still further preferably 97.0% or more, from the viewpoint of reduction in stress and favorable long-term durability.

More specifically, the relative dimension by dipping in a 2 M aqueous sulfuric acid solution can be evaluated, for example, by adjusting the water content of the electrolyte membrane to 1% or less, cutting out a square of 7 cm in one side therefrom, and dipping the cut out piece in a 2 M aqueous sulfuric acid solution of 25° C. for 30 minutes, followed by the measurement of its dimension. The water content can be measured by a method described in Examples. If the water content exceeds 1%, the membrane is dried for 2 hours in an oven heated to 50° C. under reduced pressure, and the water content can be measured again for adjustment.

The X direction means an arbitrarily selected direction on the membrane surface, and the Y direction means a direction perpendicular to the X direction on the membrane surface.

The relative dimension by dipping in a 2 M aqueous sulfuric acid solution can be set to the above range, for example, by adjusting the type of the perfluorocarbon polymer for use in the electrolyte membrane, or a draw ratio, a relaxation ratio, or the like at the time of production of the electrolyte membrane.

(Relative Dimension by Dipping in Distilled Water)

The relative dimension of the electrolyte membrane of the present embodiment in at least one of a X direction and a Y direction is 80% or more and less than 100%, and the relative dimension thereof in a Z direction is 115% or more, in terms of a relative dimension by dipping in distilled water from the viewpoint of neither causing a deflection in a cell of a redox flow battery nor reducing battery performance.

The relative dimension of the electrolyte membrane of the present embodiment in at least one of a X direction and a Y direction is preferably 99.8% or less, more preferably 99.5% or less, further preferably 99.2% or less, still further preferably 99.0% or less, in terms of the relative dimension by dipping in distilled water from the viewpoint of neither causing a deflection in a cell of a redox flow battery nor reducing battery performance. The relative dimension in at least one of a X direction and a Y direction is preferably 85% or more, more preferably 90% or more, further preferably 93.0% or more, still further preferably 94.0% or more, from the viewpoint of reduction in stress and favorable long-term durability.

The relative dimension in a Z direction is preferably 115% or more, more preferably 120% or more, further preferably 125% or more, in terms of the relative dimension by dipping in distilled water from the viewpoint of retaining water and improving proton conductivity. The relative dimension in a Z direction is preferably 160% or less, more preferably 150% or less, further preferably 140% or less, still further preferably 130% or less, from the viewpoint of permeating ion selectivity.

More specifically, the relative dimension by dipping in distilled water can be evaluated, for example, by adjusting the water content of the electrolyte membrane to 1% or less, cutting out a square of 7 cm in one side therefrom, and dipping the cut out piece in distilled water of 25° C. for 30 minutes, followed by the measurement of its dimension. The water content can be measured by a method described in Examples. If the water content exceeds 1%, the membrane is dried for 2 hours in an oven heated to 50° C. under reduced pressure, and the water content can be measured again for adjustment.

The X direction means an arbitrarily selected direction on the membrane surface, and the Y direction means a direction perpendicular to the X direction on the membrane surface. The Z direction means a direction orthogonal to the X direction and the Y direction.

The relative dimension in terms of the relative dimension by dipping in distilled water can be set to the above range, for example, by adjusting the type of the perfluorocarbon polymer for use in the electrolyte membrane, or a draw ratio, a relaxation ratio, or the like at the time of production of the electrolyte membrane.

(Puncture Strength)

The puncture strength of the electrolyte membrane according to the present embodiment is preferably 0.01 kgf/µm or more, more preferably 0.02 kgf/µm or more, further preferably 0.03 kgf/µm or more, still further preferably 0.04 kgf/µm or more, even further preferably 0.05 kgf/µm or more, in a puncture strength test given below. The upper limit of the puncture strength is not particularly limited and is, for example, 0.10 kgf/µm or less.

<Puncture Strength Test>

The electrolyte membrane left at room temperature for 12 hours or longer is sandwiched between two metal plates each having an opened round hole of 10 mm in diameter. The resulting electrolyte membrane is punctured with a needle having a curvature radius of 0.5 mm at a rate of 2 mm/sec. A value obtained by dividing the maximum load (kgf) of a load-displacement curve by the thickness (μm) of the electrolyte membrane is regarded as puncture strength (kgf/μm).

(Anion-Exchange Compound)

At least one surface of the electrolyte membrane of the present embodiment is preferably covered with an anion-exchange compound. The covering of the surface with an anion-exchange compound can improve performance as a battery in such a way as to be able to improve current efficiency. In this context, the anion-exchange compound is a compound that has a basic functional group such as a primary to tertiary amino group or a quaternary ammonium group in the molecular structure and is positively charged under an acidic condition of at least pH=1.

The covering of the electrolyte membrane surface with the anion-exchange compound imparts electrostatic repulsion to the electrolyte membrane surface, can selectively allow a proton having a low charge density to permeate the membrane while eliminating a metal ion having a high charge density to the outside of the electrolyte membrane, and can improve current efficiency.

The anion-exchange compound preferably has a tertiary amino group or a quaternary ammonium group from the viewpoint of further improving current efficiency.

Examples of the anion-exchange compound include, but are not particularly limited to, cationic polymers such as polyvinylpyridine, polyethyleneimine, vinyl benzyl trimethylammonium chloride/divinylbenzene copolymers, and polybenzimidazole, and pyrrole, dodecyl trimethylammonium, and cetyl pyridinium. Among them, polyvinylpyridine or dodecyl trimethylammonium is preferred.

(Method for Covering Surface with Anion-Exchange Compound)

Examples of the method for covering the electrolyte membrane with the anion-exchange compound include a method of dipping the electrolyte membrane in a liquid containing the anion-exchange compound dissolved or melted therein, a method of coating the electrolyte membrane with a liquid containing the anion-exchange compound dissolved or melted therein, and a method of thermally pressure-bonding a thin membrane made of the anion-exchange compound onto the electrolyte membrane. The method is not limited thereto as long as the method can unevenly distribute the anion-exchange compound on the electrolyte membrane surface.

The electrolyte membrane of the present embodiment is preferably used in a redox flow battery.

The electrolyte membrane of the present embodiment exhibits excellent battery performance, particularly, in a use method of incorporating a dry electrolyte membrane into a cell.

[Redox Flow Battery]

FIG. 1 shows one example of a schematic view of a redox flow secondary battery comprising the electrolyte membrane for a redox flow battery of the present embodiment. Redox flow secondary battery 10 of the present embodiment has electrolyzer 6 comprising: positive electrode cell chamber 2 comprising positive electrode 1 consisting of a carbon electrode; negative electrode cell chamber 4 comprising negative electrode 3 consisting of a carbon electrode; and electrolyte membrane 5 as a membrane that separates the positive electrode cell chamber 2 and the negative electrode cell chamber 4. The positive electrode cell chamber 2 contains a positive electrode electrolyte solution comprising an active material, and the negative electrode cell chamber 4 contains a negative electrode electrolyte solution comprising an active material. The positive electrode electrolyte solution and the negative electrode electrolyte solution each comprising an active material are stored in, for example, positive electrode electrolyte solution tank 7 and negative electrode electrolyte solution tank 8 and supplied to the respective cell chambers through pumps or the like. Current generated by the redox flow secondary battery may be exchanged from direct current to alternate current via AC-DC converter 9.

The redox flow secondary battery comprising the electrolyte membrane for a redox flow battery of the present embodiment has a structure where liquid-permeable porous current collector electrodes (for a negative electrode and for a positive electrode) are disposed on both sides, respectively, of the membrane and held by pressing; one of the chambers separated by the membrane serves as the positive electrode cell chamber, and the other serves as the negative electrode cell chamber; and the thicknesses of both the cell chambers are secured by a spacer.

In the case of a vanadium-type redox flow secondary battery, the charge and discharge of the battery are performed by circulating a positive electrode electrolyte solution consisting of a sulfuric acid electrolyte solution containing tetravalent vanadium ($V^{4+}$) and pentavalent vanadium ($V^{5+}$) in the positive electrode cell chamber and a negative electrode electrolyte solution containing trivalent vanadium ($V^{3+}$) and divalent vanadium ($V^{2+}$) in the negative electrode cell chamber. Thus, the positive electrode electrolyte solution and the negative electrode electrolyte solution in the redox flow battery of the present embodiment preferably comprise a vanadium ion. In this respect, at the time of charge, the vanadium ion $V^{4+}$ is oxidized into $V^{5+}$ for the emission of an electron in the positive electrode cell chamber, while $V^{3+}$ is reduced into $V^{2+}$ in the negative electrode cell chamber through an electron brought back through an external path. By this oxidation-reduction reaction, the proton ($H^+$) is an excess in the positive electrode cell chamber, whereas the proton ($H^+$) is insufficient in the negative electrode cell chamber. The membrane selectively moves an excess of protons in the positive electrode cell chamber to the negative electrode chamber so that electric neutrality is maintained. At the time of discharge, reaction opposite thereto proceeds. In this respect, current efficiency (%) is indicated by a ratio (%) obtained by dividing a discharged energy by a charged energy. Both the energies depend on the internal resistance of a battery cell, the ion selectivity of the membrane and other current losses. Decrease in internal resistance improves voltage efficiency, and improvement in ion selectivity and reduction in other current losses improve current efficiency. Therefore, these factors serve as important indexes for the redox flow secondary battery.

<Carbon Electrode>

The carbon electrode for use in the redox flow secondary battery is not particularly limited and preferably has a continuous void for the passage of the electrolyte solution therethrough. A porous material having a continuous void is more preferred.

The carbon electrode having a continuous void preferably contains fibrous carbon. The average fiber diameter of the fibrous carbon is preferably 5 μm or smaller, more preferably 4 μm or smaller, further preferably 3 μm or smaller. As a result, a surface area can be increased while the flexibility of the electrode is maintained. Thus, a favorable redox flow secondary battery having high current efficiency and low resistance is obtained. The lower limit of the average fiber diameter is not particularly limited and may be 0.1 µm or larger, may be 0.5 µm or larger, or may be 1 µm or larger. The method for measuring the average fiber diameter is based on a method described in Examples. The carbon electrode is preferably a three-dimensionally continuous carbon structure.

Examples of the carbon electrode having a continuous void include, but are not particularly limited to, carbon felt, carbon paper, and carbon foams. Among them, a carbon foam is more preferred from the viewpoint of high flexibility, a large surface area, and resistance that can be reduced. The carbon foam preferably has a structure having a three-dimensionally continuous carbon moiety. The carbon foam preferably has linear portions and node portions connecting the linear portions. The electrode having this structure can have flexibility and a high surface area, and can yield a favorable battery without reducing current efficiency even if a thinner membrane is used as the electrolyte membrane in the redox flow secondary battery.

The carbon foam may be compressed by a method known in the art, particularly, a method described in International Publication No. WO 2002/062879, to adjust a void ratio for use. The compression can adjust a void ratio and increase a carbon surface area per unit volume. Therefore, the resistance of the redox flow secondary battery can be reduced.

The density of the node portions in the carbon foam is preferably 15,000 portions/mm$^3$ or more, more preferably 30,000 portions/mm$^3$ or more, further preferably 50,000 portions/mm$^3$ or more, still further preferably 100,000 portions/mm$^3$ or more. The density of the node portions is preferably 5,000,000 portions/mm$^3$ or less, more preferably 4,000,000 portions/mm$^3$ or less, further preferably 3,500,000 portions/mm$^3$ or less, from the viewpoint of securing space in which the linear portions and the node portions are deformed upon compression.

At least a portion in the carbon foam of the present embodiment can have a location that satisfies this density of the node portions. Preferably 50% by volume, more preferably 75% by volume, particularly preferably an arbitrary location of the carbon foam satisfies the above density range.

(Ratio R of the number $N_1$ of linear portions to the number $N_n$ of node portions)

In the carbon foam according to the present embodiment, ratio R of the number $N_1$ of the linear portions to the number $N_n$ of the node portions is preferably 1.2 or more, more preferably 1.3 or more, further preferably 1.4 or more, from the viewpoint of the robustness of a three-dimensional structure and the maintenance of flexibility against pressing. The ratio R is preferably 1.7 or less, more preferably 1.6 or less, further preferably 1.5 or less.

In other words, the ratio R is an average number of branches at the node portions. In the case of a structure where unconnected linear portions are in contact, as in a nonwoven fabric, this ratio R takes a small value. On the other hand, in the case of a porous structure where linear portions are in a band-like form, for example, surrounded by honeycomb-like walls, this ratio R takes a large value.

In the present specification, the number $N_n$ of the node portions and the number $N_1$ of the linear portions are values determined by photographing the carbon foam using a X-ray CT (computerized tomography) apparatus, using a median filter in pretreatment from the obtained cross-sectional image data, then dividing regions into a structure and space using Otsu's binarization algorithm (see Nobuyuki Otsu, "Automatic Threshold Selection Method Based on Discriminant and Least Squares Criteria", The IEICE transactions on information and systems (Japanese edition), Vol. J63-D, No. 4, pp. 346-356 (1980)), preparing a three-dimensional image of the structure including the inside of the carbon foam, and using structural analysis software from the obtained three-dimensional image.

Specifically, the number $N_n$ of the node portions and the number $N_1$ of the linear portions are determined by detecting node portions and linear portions contained in the three-dimensional image obtained as mentioned above, and counting the numbers thereof. The ratio R of $N_1$ to $N_n$ can be determined from $N_n$ and $N_1$ thus obtained.

(Carbon Content)

The carbon content of the carbon foam can be determined from fluorescence X-ray measurement. The carbon content of the carbon foam of the present embodiment is preferably 51% by mass or more, preferably 60% by mass or more, preferably 65% by mass or more, preferably 70% by mass or more, preferably 75% by mass or more, preferably 80% by mass or more, more preferably 85% by mass or more, further preferably 90% by mass or more, from the viewpoint of conductivity. The upper limit of the carbon content is not particularly limited and may be 100% by mass or less or may be 99% by mass or less.

The carbon content of the carbon foam can be determined from fluorescence X-ray measurement.

(Void Ratio)

The void ratio of the carbon foam of the present embodiment is preferably 50% by volume or more, more preferably 60% by volume or more, further preferably 70% by volume or more, still further preferably 80% by volume or more, even further preferably 90% by volume or more, from the viewpoint of flexibility. The upper limit of the void ratio is not particularly limited and may be less than 100% by volume, may be 99% by volume or less, may be 98% by volume or less, or may be 95% by volume or less.

In the present specification, the void ratio is a value determined from a bulk density described below and a real density described below. The bulk density is a density based on a volume also including the void contained in the carbon foam. By contrast, the real density is a density based on a volume occupied by a material of the carbon foam.

<<Measurement of Bulk Density>>

The dimension of the carbon foam is measured using a caliper or the like, and bulk volume $V_{bulk}$ of the carbon foam is determined from the obtained dimension. Next, mass M of the carbon foam is measured using a precision balance. From the obtained mass M and bulk volume $V_{bulk}$, bulk density $\rho_{bulk}$ of the carbon foam can be determined according to the following expression (a):

$$\rho_{bulk}=M/V_{bulk} \tag{a}$$

<<Measurement of Real Density>>

Real density $\rho_{real}$ of the carbon foam can be determined by a sink-float method using a mixed solution consisting of n-heptane, carbon tetrachloride and ethylene dibromide. Specifically, the carbon foam having an appropriate size is first placed in a stoppered test tube. Next, the 3 solvents are appropriately mixed and added to the test tube, which is then dipped in a thermostat bath of 30° C. When the sample piece floats, low-density n-heptane is added thereto. On the other hand, when the test piece sinks, high-density ethylene dibromide is added thereto. The test piece is allowed to drift in the solution by repeating this operation. Finally, the density of the solution is measured using a Gay-Lussac specific gravity bottle.

<<Calculation of Void Ratio>>

From the bulk density $\rho_{bulk}$ and the real density $\rho_{real}$ determined as described above, void ratio $V_{f,pore}$ can be determined according to the following expression (b):

$$V_{f,pore}=\{(1/\rho_{bulk})-(1/\rho_{real}))/(1/\rho_{bulk})\}\times 100(\%) \quad (b)$$

(Crystallite Size)

Crystallite size Lc of the carbon foam of the present embodiment is preferably 1.1 nm or larger, and is more preferably 1.5 nm or larger from the viewpoint of conductivity. The crystallite size is preferably 4.0 nm or smaller, more preferably 3.0 nm or smaller, from the viewpoint of physical vulnerability. The crystallite size Lc is measured by the following method.

<<Evaluation of Crystallite Size>>

The crystallite size Lc is evaluated from diffraction on the (002) plane of the carbon foam. A sample is crushed in a mortar, followed by the wide-angle X-ray measurement of the crushed sample using a desktop X-ray diffraction apparatus D2 PHASER (manufactured by Bruker Corp.). Specific measurement conditions are as follows.

—Measurement Conditions—
Radiation source: Cu Kα
Tube current: 30 mA
Tube voltage: 40 kV
Slit: 1 mm
Sample revolution speed: 10 revolutions/min
Measurement time of one step: 0.3 sec
Start angle (2θ): 5.00°
Measurement step (2θ): 0.01°
End angle (2θ): 90.00°

After the measurement, the obtained data is analyzed to calculate crystallite size Lc. For the calculation, the crystallite size Lc can be determined by substituting half width β of a diffraction peak of the (002) plane appearing around 2θ=25 degrees, and angle θ of the maximum peak value into the expression (c) (Scherrer's equation) given below. In general, carbonization at a higher temperature offers higher crystalline nature and a larger value of Lc.

$$Lc=(K\lambda)/\beta \cos \theta \quad (c)$$

In this context, K is a form factor, and λ is the wavelength of the radiation source. Since the form factor is diffraction on the (002) plane, 0.90 is substituted. Since the radiation source used this time is CuKα, 1.541 is substituted for calculation.

(Average Fiber Diameter)

The carbon foam of the present embodiment preferably contains fibrous carbon. The average fiber diameter of the fibrous carbon is preferably 5 μm or smaller, more preferably 4 μm or smaller, further preferably 3 μm or smaller. As a result, a surface area can be increased while the flexibility of the electrode is maintained. Thus, a favorable redox flow secondary battery having high current efficiency and low resistance is obtained. The lower limit of the average fiber diameter is not particularly limited and may be 0.1 μm or larger, may be 0.5 μm or larger, or may be 1 μm or larger. The method for measuring the average fiber diameter is based on a method described in Examples.

(Specific Surface Area)

Specific surface area S is preferably 0.5 m²/g or more, more preferably 1 m²/g or more. This can increase the size of a reaction site of the redox flow battery and can form a favorable battery having low resistance. The upper limit of the specific surface area S is not particularly limited and may be 100 m²/g or less, may be 50 m²/g or less, may be 30 m²/g or less, may be 15 m²/g or less, or may be 10 m²/g or less. The specific surface area S is determined from the real density of the carbon electrode and the average fiber diameter of the fibrous carbon constituting the carbon electrode. More specifically, the specific surface area S is determined by the following method.

<<Calculation of Specific Surface Area S>>

Supposing that the fibrous carbon constituting the carbon electrode has a cylindrical shape, the specific surface area S of the carbon electrode can be determined according to the following expression (d) from the real density $\rho_{real}$ and the average fiber diameter determined as mentioned above:

$$S=4/(\rho_{real}\times \text{Average fiber diameter}) \quad (d)$$

(Ratio of Graphite and Surface Functional Group Concentration)

In the carbon foam according to the present embodiment, the ratio of graphite to carbon atoms measured by X-ray photoelectron spectroscopy can be 70 at % or more and 80 at % or less. When the ratio of graphite is 70 at % or more, resistance is kept stable and low against long-term charge and discharge in a configuration using the carbon foam as an electrode in a secondary battery. When the ratio of graphite is 80 at % or less, wettability for an electrolyte solution can be favorable.

Alternatively or additionally, in the carbon foam according to the present embodiment, the ratio of a carbon atom having a hydroxy group to carbon atoms measured by X-ray photoelectron spectroscopy can be 5 at % or more and 15 at % or less. When the ratio is 5 at % or more, wettability for an electrolyte solution can be favorable. When the ratio is 15 at % or less, resistance can be kept stable and low against long-term charge and discharge in a configuration using the carbon foam as an electrode in a secondary battery.

Alternatively or additionally, in the carbon foam according to the present embodiment, the ratio of a carbon atom constituting a carbonyl group to carbon atoms measured by X-ray photoelectron spectroscopy can be 10 at % or more and 15 at % or less. When the ratio is 10 at % or more, wettability for an electrolyte solution can be favorable. When the ratio is 15 at % or less, resistance can be kept stable and low against long-term charge and discharge in a configuration using the carbon foam as an electrode in a secondary battery.

Alternatively or additionally, in the carbon foam according to the present embodiment, the ratio of a carbon atom constituting a carboxy group to carbon atoms measured by X-ray photoelectron spectroscopy can be 0.1 at % or more and 5 at % or less. When the ratio is 0.1 at % or more, wettability for an electrolyte solution can be favorable. When the ratio is 5 at % or less, resistance can be kept stable and low against long-term charge and discharge in a configuration using the carbon foam as an electrode in a secondary battery.

<<Method for Measuring Ratio of Graphite and Functional Group Concentration>>

In the present specification, the surface analysis of the carbon foam by X-ray photoelectron spectroscopy is conducted as follows: the oxygen-containing functional group concentrations of the carbon foam surface can be measured using a X-ray photoelectron spectrometer (PerkinElmer, Inc., ESCA-5500MT). The obtained C1s peaks are fitted into four Gaussian distributions peaking at binding energies 284.4 eV (graphite), 285.6 eV (C—OH), 287.0 eV (C=O) and 288.6 eV (COOH), and the ratio of the area of each peak to the total area of the four peaks can be calculated to measure a surface functional group concentration.

(Method for Preparing Carbon Foam)

The carbon foam can be produced, for example, by carbonizing a foam resin. For the carbonization, the starting material foam resin is carbonized with its skeletal structure maintained. The foam resin that can be used as a starting material preferably has a continuous void from the viewpoint of liquid permeability for an electrolyte solution after carbonization. The foam resin for use as a starting material preferably has linear portions and node portions connecting the linear portions, and has a structure having a three-dimensionally continuous resin moiety. Examples thereof include melamine foams.

The carbon foam of the present embodiment can be obtained by carbonizing the material foam resin by heat treatment in an inert gas stream of nitrogen or the like or in an inert atmosphere such as vacuum while applying a compressive load thereto. In this respect, it is vital to set the heat treatment temperature to a temperature equal to or higher than the softening point of the foam resin. This can elevate the density of the node portions in the carbon foam and impart anisotropy to the orientation of the fibrous carbon constituting the carbon foam by orienting the fibrous carbon in a direction perpendicular to the direction of application of a compressive load.

In the case of using, for example, a melamine resin foam, as the foam resin, for example, a melamine/formaldehyde condensed foam produced by a method disclosed in Japanese Patent Laid-Open No. 4-349178 can be used as the melamine resin foam.

According to the method, first, an aqueous solution or dispersion containing a melamine/formaldehyde precondensate, an emulsifier, a volatile foaming agent, a curing agent, and optionally, a well-known filler can be subjected to foaming treatment and subsequent curing treatment to obtain a melamine/formaldehyde condensed foam.

In the method, the melamine/formaldehyde precondensate used can have, for example, melamine:formaldehyde=1:1.5 to 1:4 and an average molecular weight of 200 to 1000. Examples of the emulsifier include 0.5 to 5% by mass (based on the melamine/formaldehyde precondensate; the same holds true for the description below) of sodium salt of alkylsulfonic acid or arylsulfonic acid. Examples of the volatile foaming agent include 1 to 50% by mass of pentane or hexane. Examples of the curing agent include 0.01 to 20% by mass of hydrochloric acid or sulfuric acid. The foaming treatment and the curing treatment can be performed by heating the solution consisting of the components to temperatures set according to the type of the volatile foaming agent, etc., used.

The heat treatment temperature for the carbonization of the melamine resin foam is equal to or higher than the softening point (300 to 400° C.) of the melamine resin foam. The heat treatment temperature is preferably 800° C. or higher, more preferably 1000° C. or higher. The heat treatment temperature is preferably 3000° C. or lower, more preferably 2500° C. or lower, from the viewpoint of physical vulnerability ascribable to high crystalline nature.

The compressive load to be applied to the carbon foam is preferably 50 Pa or larger, more preferably 200 Pa or larger, from the viewpoint of conferring anisotropy. The compressive load is preferably 2000 Pa or smaller, more preferably 1500 Pa or smaller, from the viewpoint of maintaining a three-dimensional structure.

For performing compression using a vacuum press apparatus, it is necessary to determine a film thickness after pressure using a spacer and control a compression ratio by dividing the original thickness by the thickness of the spacer. In this case, the compression ratio is preferably 4 or more, more preferably 10 or more, from the viewpoint of conferring anisotropy. The compression ratio is preferably 100 or less, more preferably 50 or less, from the viewpoint of maintaining a three-dimensional structure.

The compressive stress to the resin foam may be applied not only in one direction but in two directions.

In the redox flow secondary battery 10 according to the present embodiment, use of the carbon foam mentioned above as the positive electrode 1 consisting of a carbon electrode can keep cell resistance low and further improve current efficiency.

As described above, the present specification discloses the following embodiments.

[A]

An electrolyte membrane for a redox flow battery, comprising a perfluorocarbon polymer having an ion-exchange group, wherein the perfluorocarbon polymer has equivalent weight EW of the ion-exchange group of 600 g/eq or more and 2000 g/eq or less, and a relative dimension of the electrolyte membrane in at least one of a X direction and a Y direction is 80% or more and less than 100% in the following relative dimension by dipping in 2 M aqueous sulfuric acid solution:

<Relative Dimension by Dipping in 2 M Aqueous Sulfuric Acid Solution> an electrolyte membrane for testing having a water content of 1% or less is prepared; the electrolyte membrane for testing is dipped in a 2 M aqueous sulfuric acid solution at 25° C. for 30 minutes; and ratios of change in dimension in a X direction on a surface of the electrolyte membrane for testing and a Y direction orthogonal to the X direction are calculated according to the following expression:

$$\text{Relative dimension (\%)} = \{(\text{Dimension in a specific direction after the dipping})/(\text{Dimension in the specific direction before the dipping})\} \times 100.$$

[B]

An electrolyte membrane for a redox flow battery, comprising a perfluorocarbon polymer having an ion-exchange group, wherein the perfluorocarbon polymer has equivalent weight EW of the ion-exchange group of 600 g/eq or more and 2000 g/eq or less, and a relative dimension of the electrolyte membrane in at least one of a X direction and a Y direction is 80% or more and less than 100%, and a relative dimension thereof in a Z direction is 115% or more, in the following relative dimension by dipping in distilled water:

<Relative Dimension by Dipping in Distilled Water> an electrolyte membrane for testing having a water content of 1% or less is prepared; the electrolyte membrane for testing is dipped in distilled water at 25° C. for 30 minutes; and ratios of change in dimension in a X direction on a surface of the electrolyte membrane for testing, a Y direction orthogonal to the X direction, and a Z direction orthogonal to the X direction and the Y direction are calculated:

$$\text{Relative dimension (\%)} = \{(\text{Dimension in a specific direction after the dipping})/(\text{Dimension in the specific direction before the dipping})\} \times 100.$$

[C]

A method for producing an electrolyte membrane for a redox flow battery, comprising the step of drawing a raw material membrane containing a perfluorocarbon polymer having an ion-exchange group, wherein the perfluorocarbon polymer has equivalent weight EW of the ion-exchange group of 600 g/eq or more and 2000 g/eq or less, a craze area ratio of the electrolyte membrane is 1.5% or less, and a relative dimension of the electrolyte membrane in at least one of a X direction and a Y direction is 80% or more and less than 100% in the following relative dimension by dipping in 2 M aqueous sulfuric acid solution:

<Relative Dimension by Dipping in 2 M Aqueous Sulfuric Acid Solution> an electrolyte membrane for testing having a water content of 1% or less is prepared; the electrolyte membrane for testing is dipped in a 2 M aqueous sulfuric acid solution at 25° C. for 30 minutes; and ratios of change in dimension in a X direction on a surface of the electrolyte membrane for testing and a Y direction orthogonal to the X direction are calculated according to the following expression:

Relative dimension (%)={(Dimension in a specific direction after the dipping)/(Dimension in the specific direction before the dipping)}×100.

[D]

A method for producing an electrolyte membrane for a redox flow battery, comprising the step of drawing a raw material membrane containing a perfluorocarbon polymer having an ion-exchange group under heating, wherein the perfluorocarbon polymer has equivalent weight EW of the ion-exchange group of 600 g/eq or more and 2000 g/eq or less, and a relative dimension of the electrolyte membrane in at least one of a X direction and a Y direction is 80% or more and less than 100%, and a relative dimension thereof in a Z direction is 115% or more, in the following relative dimension by dipping in distilled water:

<Relative Dimension by Dipping in Distilled Water> an electrolyte membrane for testing having a water content of 1% or less is prepared; the electrolyte membrane for testing is dipped in distilled water at 25° C. for 30 minutes; and ratios of change in dimension in a X direction on a surface of the electrolyte membrane for testing, a Y direction orthogonal to the X direction, and a Z direction orthogonal to the X direction and the Y direction are calculated:

Relative dimension (%)={(Dimension in a specific direction after the dipping)/(Dimension in the specific direction before the dipping)}×100.

EXAMPLES

Hereinafter, the present embodiment will be described further specifically with reference to Examples. However, the present embodiment is not limited by Examples given below. Evaluation methods and measurement methods for use in the present embodiment are as follows.

<Equivalent Weight EW>

Approximately 0.02 to 0.10 g of an electrolyte membrane was dipped in 50 mL of a saturated aqueous solution of NaCl (0.26 g/mL) of 25° C., left for 30 minutes with stirring, and then neutralization-titrated using a 0.01 N aqueous sodium hydroxide solution (manufactured by Wako Pure Chemical Industries, Ltd., reagent special grade) with phenolphthalein (manufactured by Wako Pure Chemical Industries, Ltd., reagent special grade) as an indicator. The Na-type ion-exchange membrane obtained after the neutralization was rinsed with pure water, then dried in vacuum, and weighed. When the equivalent of sodium hydroxide required for the neutralization was defined as M (mmol) and the mass of the Na-type ion-exchange membrane was defined as W (mg), equivalent weight EW (g/eq) was determined according to the following expression:

Equivalent weight $EW=(W/M)-22$

This operation was repetitively performed 5 times. Then, the maximum value and the minimum value were excluded from the calculated five EW values, and the remaining three values were arithmetically averaged to obtain measurement results.

<Post-Drawing Film Thickness>

A drawn electrolyte membrane was left standing for 12 hours or longer in a constant-temperature room of 23° C. and 65% relative humidity, and then measured using a contact-type film thickness meter (manufactured by Toyo Seiki Seisaku-sho, Ltd.).

<Flatness>

The flatness of an electrolyte membrane was evaluated on the basis of the ratio of a length along a membrane surface to the projected dimension of the membrane. The length along a membrane surface was determined from the height-position profile of the membrane surface measured under a reading microscope. Specifically, the height of the membrane surface of a piece of approximately 140 mm square cut out from the membrane was measured at 25 points spaced by 5 mm in a X-axis direction. The height-position profile of the membrane surface was approximated with a spline function, and the length along the membrane surface was determined by numerical calculation. The flatness index was determined according to the following expression and evaluated according to the following criteria:

Flatness index=Length along the membrane surface/ Projected dimension of the membrane A: less than 1.05
B: 1.05 or more and less than 1.1
C: 1.1 or more and less than 1.2
D: 1.2 or more <Craze Area Ratio>

The craze area ratio was determined from visible light transmittance mapping measured under an optical microscope equipped with an automatic stage movable in an arbitrary X-axis direction and a Y-axis direction orthogonal to the X-axis, and a visible light spectrophotometer "uSight-2000" (product name, manufactured by TechnoSpex Pte Ltd.). Light concentrated to a diameter of 1 μm was moved at an inter-step distance of 1 μm, and the visible light transmittance in a 75 mm long×50 mm wide range of a drawn membrane was mapped. The wavelength range of the visible light for measurement was 450 to 700 nm. The ratio of the area of a region having a transmittance of 10% or less to the total mapped area was regarded as a craze area ratio (%).

<Puncture Strength>

The puncture strength was measured as to an electrolyte membrane left at room temperature for 12 hours or longer using a puncture testing machine "Puncture Strength Tester SPK-NDA1-A" (product name, manufactured by Kato Tech Co., Ltd.). The electrolyte membrane sandwiched between two metal plates each having an opened round hole of 10 mm in diameter was punctured with a needle having a curvature radius of 0.5 mm at a rate of 2 mm/sec. The puncture strength (kgf/μm) was determined by dividing the maximum load (kgf) of a load-displacement curve by the thickness (μm) of the electrolyte membrane.

<Ion Cluster Size>

The ion cluster size was measured by small-angle X-ray scattering (SAXS). An electrolyte membrane was dipped in water of 25° C. for 24 hours, and transmitted scattered light was detected through incident X-ray in point focus in a membrane surface direction and a direction perpendicular to the membrane surface in the state dipped in water. For measurement, a small-angle X-ray scattering measurement apparatus "Nano Viewer" (manufactured by Rigaku Corp.) was used. A small-angle region was measured using a detector "PILATUS100K" (manufactured by Rigaku Corp.) at a sample-detector distance of 841 mm, and a wide-angle region was measured using an imaging plate as a detector at a sample-detector distance of 75 mm. Both the profiles were combined to obtain scattering data in the scattering angle range of $0.1° <$ scattering angle $(2\theta) < 30°$.

Seven samples were used in the measurement, and the exposure time was 15 minutes for both the small-angle region and the wide-angle region. In the case of obtaining data using a two-dimensional detector, the data was converted to one-dimensional data by a reasonable process such as circular averaging. The correction of errors derived from the detector such as dark current corrections of the detector and the correction of scattering ascribable to substances other than the sample (empty cell scattering correction) were carried out for the obtained SAXS profile. When the influence of the X-ray beam shape (the influence of smear) on the SAXS profile was large, the X-ray beam shape was also corrected (desmeared). The ion cluster size was determined as to the one-dimensional SAXS profile thus obtained according to the approach described in Yasuhiro Hashimoto, Naoki Sakamoto, Hideki Iijima, Japanese Journal of Polymer Science and Technology, vol. 63, No. 3, pp. 166, 2006. Specifically, supposing that the ion cluster structure was indicated by a core-shell type hard sphere having a particle size distribution, the SAXS profile of a scattering angle region where scattering derived from ion clusters is dominant in the actually measured SAXS profile was fitted according to a theoretical scattering formula based on this model, to determine an average cluster diameter (ion cluster size) and an ion cluster number density. In this model, the core moiety was regarded as corresponding to an ion cluster, and the core diameter was regarded as corresponding to an ion cluster size. The shell layer was imaginary, and the electron density of the shell layer was regarded as being the same as that of the matrix moiety. Here, the shell layer thickness was set to 0.25 nm. The theoretical scattering formula of the model used in fitting is shown in the following expression (A). The fitting range was $1.4 < 2\theta < 6.7°$.

$$I_{HS}(q) = CNS(q, a_2, \eta) \int_0^\infty P(a)[V(a)\Phi(qa)]^2 da + I_b(q) \quad \text{Expression (A)}$$

wherein $$q = 4\pi \sin \theta / \lambda$$

$$S(q, a_2, \eta) = \frac{1}{1 + 24\eta[G(A)/A]}$$

$$G(A) = \frac{\alpha}{A^2}(\sin A - A \cos A) +$$

$$\frac{\beta}{A^3}[2A \sin A + (2 - A^2)\cos A - 2] +$$

$$\frac{\gamma}{A^5}(-A^4 \cos A + 4$$

$$[(3A^2 - 6)\cos A + (A^3 - 6A)\sin A + 6])$$

$$\alpha = (1 + 2\eta)^2/(1 - \eta)^4$$

$$\beta = -6\eta(1 + \eta/2)^2/(1 - \eta)^4$$

$$\gamma = 1/2\eta(1 + 2\eta)^2/(1 - \eta)^4$$

$$A = 2qa_2$$

$$a_2 = a_0 + t$$

$$V(a) = \frac{4}{3}\pi a^3$$

$$\Phi(qa) = \frac{3}{(qa)^3}[\sin(qa) - (qa)\cos(qa)]$$

$$P(a) = \frac{p(a)/V(a)}{\int p(a)/V(a)da}$$

$$p(a) = \frac{M^M}{\Gamma(M)a_0^M} a^{M-1} \exp\left(-\frac{M}{a_0}a\right)$$

$$M = \left(\frac{\sigma}{a_0}\right)^{-2}$$

In the expression, C represents an apparatus constant; N represents a cluster number density; η represents the volume fraction of a hard sphere, supposing that the core, i.e., the ion cluster moiety, and its surrounding imaginary shell constitute the hard sphere; θ represents a Bragg angle; λ represents a X ray wavelength used; t represents a shell layer thickness; $a_0$ represents an average ion cluster radius; Γ(x) represents a gamma function; and σ represents the standard deviation of the ion cluster radius (core radius). P(a) represents the distribution function of core radius a, wherein the volume distribution of a follows Gaussian distribution p(a). $I_{b(q)}$ represents background scattering including scattering derived from excessive water during measurement and thermal diffuse scattering, wherein this factor is assumed as a constant. For fitting, N, η, $a_0$, σ, and $I_{b(q)}$ among the parameters are variable parameters. In the present specification, the ion cluster size means an average diameter of ion clusters ($2a_0$).

<Orientation Parameter>

The intra-membrane-surface orientation parameter and extra-membrane-surface orientation parameter of an electrolyte membrane were determined by approximating azimuthal intensity distribution I(φ) of a peak derived from an ion cluster in the two-dimensional small-angle scattering measured according to the method mentioned above, using an orientation function represented by the following expression:

$$I(\phi) = Q \frac{1 - q^2}{1 + q^2 - 2q \cos \phi}$$

In this context, Q is a constant, φ is an azimuth, and q is an orientation parameter.

When the intra-membrane-surface orientation parameter was determined, the X direction was set to φ=0. Thus, q is 1 in the complete orientation of ion clusters in the X direction, whereas q is −1 in the complete orientation thereof in the Y direction. On the other hand, q is 0 in random orientation.

When the extra-membrane-surface orientation parameter was determined, the normal direction of the membrane was set to $\phi=0$. Thus, q is 1 in the complete orientation of ion clusters in the normal direction, whereas q is −1 in the complete orientation thereof in the membrane surface direction. On the other hand, q is 0 in random orientation.

<Long Period of Crystals>

The long period of crystals was determined according to the Bragg's equation from the position of a peak derived from the periodicity of difference in electron density between crystals and amorphous matter, which appeared in the scattering vector range of 0.1 to 1.0 $nm^{-1}$ in the one-dimensional SAXS profile obtained according to the method mentioned above.

On the other hand, the peak intensity was defined as the ratio of difference between peak top intensity and baseline intensity to the baseline intensity. A sample from which no peak was detected was regarded as having no detectable difference in intensity and thus described as "-".

<Relative Dimension by Dipping in 2 M Aqueous Sulfuric Acid Solution>

An electrolyte membrane was dried under reduced pressure at 50° C. or lower for 2 hours to adjust its water content to 1% by mass or less. A square of 7 cm in one side was cut out therefrom to prepare an electrolyte membrane for testing. The electrolyte membrane for testing was dipped in a 2 M aqueous sulfuric acid solution of 25° C. for 30 minutes. The dimension of the electrolyte membrane for testing thus dipped in a X direction and a Y direction were measured under a reading electroscope "D2XY-KSH" (product name, manufactured by Nihon Koki Seisakusho Co., Ltd.). The ratios of change in dimension were calculated according to the expression given below. The X direction means an arbitrarily selected direction on the membrane surface, and the Y direction means a direction perpendicular to the X direction on the membrane surface.

Relative dimension (%)={(Dimension in a specific direction after the dipping)/(Dimension in the specific direction before the dipping)}×100.

The obtained ratios of change in dimension are shown in Tables 1 and 2.

<Relative Dimension by Dipping in Distilled Water>

An electrolyte membrane was dried under reduced pressure at 50° C. or lower for 2 hours to adjust its water content to 1% by mass or less. A square of 7 cm in one side was cut out therefrom to prepare an electrolyte membrane for testing. The electrolyte membrane for testing was dipped in distilled water of 25° C. for 30 minutes. The dimension of the electrolyte membrane for testing thus dipped in a X direction, a Y direction and a Z direction were measured under a reading electroscope "D2XY-KSH" (product name, manufactured by Nihon Koki Seisakusho Co., Ltd.). The ratios of change in dimension were calculated according to the expression given below. The X direction means an arbitrarily selected direction on the membrane surface, and the Y direction means a direction perpendicular to the X direction on the membrane surface. The Z direction means a direction orthogonal to the X direction and the Y direction.

Relative dimension (%)={(Dimension in a specific direction after the dipping)/(Dimension in the specific direction before the dipping)}×100.

The obtained ratios of change in dimension are shown in Tables 1 and 2.

<Water Content>

An electrolyte membrane was cut into 5 cm×5 cm, and the initial weight of the cut out piece was measured with a precision balance. Then, its weight after drying was measured under the following measurement conditions using a halogen moisture meter "HX204" (product name, manufactured by Mettler-Toledo International Inc.).

Measurement Conditions
Drying program: slow rate
Lamp time: 3.00 min
Drying temperature: 160° C.
Switch-off reference: 1 mg/50 sec Water content (%)={(Initial weight−Weight after drying)/(Weight after drying)}×100

<Redox Flow Battery Evaluation (1)>

In redox flow battery evaluation (1), a cell was used which was constituted by a Viton rubber gasket, a Teflon® flow channel frame, a graphite separator, and a stainless end plate. The electrolyte membrane used was a 50×80 mm piece cut out from an electrolyte prepared in each of Examples and Comparative Examples. The film thickness of the gasket was adjusted such that the compression ratio (ratio in thickness between before and after compression) of an electrode was 75%. The electrode used was a 33×30 mm piece cut out from a carbon fiber nonwoven fabric "SIGRACELL GFA6EA" (product name, manufactured by SGL Carbon AG).

Tow electrodes, the electrolyte membrane, and cell constituent members were combined according to a predetermined order and fastened at a predetermined torque using stainless bolts. The assembled cell was connected to an electrolyte solution circulation apparatus constituted by an electrolyte solution tank and a liquid feed pump. 30 mL of a vanadium sulfate solution having a vanadium ion concentration of 1.5 M, a vanadium ion valence of 3.5, a sulfate ion concentration of 4.5 M was added to the electrolyte solution tank and circulated at a flow rate of 100 mL/min. A charge and discharge test was conducted by the constant current method using a potentiostat "VSP" (product name, manufactured by BioLogic SAS). The voltage range was 1.00 to 1.55 V, and the current density was 80 $mA/cm^2$.

(Self-Discharge)

A cell was set in the same way as in the redox flow battery evaluation (1) and charged to 1.55 V, followed by the measurement of cell voltage every hour in an open circuit. The time required for the cell voltage to fall below 1.00 V was evaluated according to the following criteria.

A: 250 hours or longer
B: 200 hours or longer and shorter than 250 hours
C: 150 hours or longer and shorter than 200 hours
D: shorter than 150 hours (Cell Resistance)

The resistance was determined according to the expression given below from average voltages $V_c$ and $V_d$ at the time of charge and discharge. The obtained results are shown in Tables 1 and 2.

Cell resistance=$(V_d-V_d)/(2\times 0.08)$ ($\Omega cm^2$)

(Liquid Movement)

After evaluation at 200 continuous cycles each involving charge and discharge in the range of 1.00 to 1.55 V, the amount of the electrolyte solution in the electrolyte solution tank was evaluated. The difference in the amount of the electrolyte solution (mL) between the negative side and the positive side is described in Tables 1 and 2.

(Deflection of Membrane)

After evaluation at 200 continuous cycles according to the redox flow battery evaluation (1), the cell was disintegrated, and the gasket and the electrolyte membrane were isolated and evaluated from the following viewpoint.

A: neither the gasket nor the electrolyte membrane underwent a deflection.

B: the electrolyte membrane swelled and underwent a deflection of 0.5 mm or more from the gasket surface.

C: the electrolyte membrane swelled and underwent a deflection of 1.0 mm or more from the gasket surface.

D: the electrolyte membrane was cracked during the course of evaluation.

(Crack in Membrane)

After evaluation at 200 continuous cycles according to the redox flow battery evaluation, the cross section of the electrolyte membrane was observed under a scanning electron microscope "SU8010" (product name, manufactured by Hitachi High-Tech Corp.) and evaluated from the following viewpoint.

A: no crack occurred on the cross section.

B: one crack elongated in the membrane surface direction occurred on the cross section.

C: two or three cracks elongated in the membrane surface direction occurred on the cross section.

D: three or more cracks elongated in the membrane surface direction occurred on the cross section.

(Current Efficiency)

The current efficiency was determined by dividing a discharge capacity by a charge capacity at the time of 200 cycles of charge and discharge. The obtained results are shown in Tables 1 and 2.

<Perfluorocarbon Polymer>

In the present Examples, perfluorocarbon polymers having the following two types of structures were used.

Perfluorocarbon polymer having a structure represented by the following formula (P1):

$$[CF_2CF_2]-[CF_2-CF(-O-CF_2CF_2-SO_3H)]- \quad (P1)$$

Perfluorocarbon polymer having a structure represented by the following formula (P2):

$$[CF_2CF_2]-[CF_2-CF(-O-CF_2CFCF_3-O-CF_2CF_2-SO_3H)]- \quad (P2)$$

Example 1

A raw material membrane of 100 μm in thickness made of a perfluorocarbon polymer (polymer structure: formula (P1), equivalent weight EW=950 g/eq) was drawn by simultaneous biaxial drawing using a batch-type biaxial drawing machine "IMC-1AA6" (product name, manufactured by Imoto Machinery Co., Ltd.). A cut out piece of 92.5 mm in both a X direction and a Y direction orthogonal to each other from the raw material membrane was held in the drawing machine such that the inter-chuck distances in the X direction and the Y direction were 72.5 mm. After a lapse of 3 minutes after the temperature of a heating chamber in the drawing machine reaching 140° C., the simultaneous biaxial drawing was started at a drawing rate of 100 mm/min. After the inter-chuck distances in the X direction and the Y direction reaching 145 mm, the drawing was terminated, and cooling was immediately started by opening the heating chamber with the membrane held by the chuck. At the same time therewith, the inter-chuck distances were narrowed by 0.7 mm such that relaxation ratios in the X direction and the Y direction were 0.5%. The membrane cooled to room temperature was taken out of the chucks to obtain a biaxially drawn electrolyte membrane having draw ratios of 2.0 in the X direction and the Y direction.

Example 2

A biaxially drawn electrolyte membrane was prepared in the same way as in Example 1 except that: the thickness of the raw material membrane was 150 μm; and the draw ratios in the X direction and the Y direction were 2.5.

Example 3

A biaxially drawn electrolyte membrane was prepared in the same way as in Example 1 except that: the thickness of the raw material membrane was 70 μm; and the draw ratios in the X direction and the Y direction were 2.9 and 1.0, respectively.

Example 4

A biaxially drawn electrolyte membrane was prepared in the same way as in Example 1 except that: the thickness of the raw material membrane was 180 μm; and the draw ratios in the X direction and the Y direction were 2.9 and 2.5, respectively.

Example 5

A biaxially drawn electrolyte membrane was prepared in the same way as in Example 1 except that: the thickness of the raw material membrane was 210 μm; the draw ratios in the X direction and the Y direction were 2.9; and the relaxation ratios in the cooling process were 1.0%.

Example 6

A biaxially drawn electrolyte membrane was prepared in the same way as in Example 1 except that: the equivalent weight EW of the perfluorocarbon polymer was 1150 g/eq; the thickness of the raw material membrane was 80 μm; and the draw ratios in the X direction and the Y direction were 1.8.

Example 7

A biaxially drawn electrolyte membrane was prepared in the same way as in Example 6 except that the thickness of the raw material membrane was 65 μm.

Example 8

A biaxially drawn electrolyte membrane was prepared in the same way as in Example 1 except that the equivalent weight EW of the perfluorocarbon polymer was 700 g/eq.

Example 9

A biaxially drawn electrolyte membrane was prepared in the same way as in Example 1 except that: the polymer was changed to a perfluorocarbon polymer (polymer structure: formula (P2), equivalent weight EW=1100 g/eq); the thickness of the raw material membrane was 150 μm; the draw ratios in the X direction and the Y direction were 2.5; and the drawing temperature was 100° C.

Example 10

A biaxially drawn electrolyte membrane was prepared in the same way as in Example 9 except that: the thickness of the raw material membrane was 200 μm; and the draw ratios in the X direction and the Y direction were 3.2 and 2.5, respectively.

Example 11

A biaxially drawn electrolyte membrane was prepared in the same way as in Example 9 except that: the thickness of the raw material membrane was 420 μm; and the draw ratios in the X direction and the Y direction were 5.2.

Example 12

An electrolyte membrane was biaxially drawn in the same way as in Example 1 except that: the thickness of the raw material membrane was 180 μm; and the draw ratios in the X direction and the Y direction were 2.9 and 2.5, respectively. The obtained membrane was further fixed to a metal frame and heat-treated at 140° C. for 5 minutes to obtain a biaxially drawn electrolyte membrane.

Example 13

A biaxially drawn electrolyte membrane was prepared in the same way as in Example 12 except that: the thickness of the raw material membrane was 210 μm; the draw ratios in the X direction and the Y direction were 2.9; and the relaxation ratios in the cooling process were 1.0%.

Example 14

An electrolyte membrane was biaxially drawn in the same way as in Example 9 except that: the thickness of the raw material membrane was 200 μm; and the draw ratios in the X direction and the Y direction were 3.2 and 2.5, respectively. The obtained membrane was further fixed to a metal frame and heat-treated at 100° C. for 5 minutes to obtain a biaxially drawn electrolyte membrane.

Example 15

A biaxially drawn electrolyte membrane was prepared in the same way as in Example 14 except that: the thickness of the raw material membrane was 420 μm; and the draw ratios in the X direction and the Y direction were 5.2.

Example 16

A biaxially drawn electrolyte membrane was prepared in the same way as in Example 13 except that the relaxation ratios in the cooling process were 0.5%.

Example 17

A biaxially drawn electrolyte membrane was prepared in the same way as in Example 13 except that the relaxation ratios in the cooling process were 0.2%.

Example 18

A biaxially drawn electrolyte membrane was prepared in the same way as in Example 13 except that the polymer was changed to a perfluorocarbon polymer (polymer structure: formula (P1), equivalent weight EW=750 g/eq).

Example 19

A biaxially drawn electrolyte membrane was prepared in the same way as in Example 18. Then, the electrolyte membrane was dipped in an aqueous solution containing 10% by mass of polyvinylpyridine for 10 minutes. The electrolyte membrane thus dipped was washed with water and dried overnight to prepare an electrolyte membrane.

Example 20

A biaxially drawn electrolyte membrane was prepared in the same way as in Example 18. Then, the electrolyte membrane was dipped in an aqueous solution containing 0.1% by mass of dodecyl trimethylammonium chloride for 10 minutes. The electrolyte membrane thus dipped was washed with water and dried overnight to prepare an electrolyte membrane.

Example 21

A biaxially drawn electrolyte membrane was prepared in the same way as in Example 13 except that the relaxation ratios in the cooling process were 0%.

Comparative Example 1

A biaxially drawn electrolyte membrane was prepared in the same way as in Example 1 except that: the raw material membrane was changed to a raw material membrane of 25 μm in thickness made of a perfluorocarbon polymer (polymer structure: formula (P1), equivalent weight EW=750 g/eq); and biaxial drawing was not performed.

Comparative Example 2

A biaxially drawn electrolyte membrane was prepared in the same way as in Example 1 except that: the equivalent weight EW of the perfluorocarbon polymer was 750 g/eq; the draw ratios in the X direction and the Y direction were 2.0; and the relaxation ratios in the cooling process were 0%.

Comparative Example 3

A biaxially drawn electrolyte membrane was prepared in the same way as in Example 1 except that: the thickness of the raw material membrane was 400 μm; the draw ratios in the X direction and the Y direction were 4.0; and the relaxation ratios in the cooling process were 0%.

Comparative Example 4

A biaxially drawn electrolyte membrane was prepared in the same way as in Example 1 except that: the polymer structure of the perfluorocarbon polymer was the formula (P2); the equivalent weight EW was 1100 g/eq; the thickness of the raw material membrane was 200 μm; the draw ratios in the X direction and the Y direction were 3.2 and 2.5, respectively; the drawing temperature was 100° C.; and the relaxation ratios in the cooling process were 0%.

TABLE 1

| | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Raw material membrane | Polymer structure | P1 | P1 | P1 | P1 | P1 | P1 | P1 | P1 | P2 | P2 | P2 | P1 |
| | EW | 950 | 950 | 950 | 950 | 950 | 1150 | 1150 | 700 | 1100 | 1100 | 1100 | 950 |
| | Thickness (μm) | 100 | 150 | 70 | 180 | 210 | 80 | 65 | 100 | 150 | 200 | 420 | 180 |
| Drawing | Draw ratio X-axis direction | 2.0 | 2.5 | 2.9 | 2.9 | 2.9 | 1.8 | 1.8 | 2.0 | 2.5 | 3.2 | 5.2 | 2.9 |
| | Y-axis direction | 2.0 | 2.5 | 1.0 | 2.5 | 2.9 | 1.8 | 1.8 | 2.0 | 2.5 | 2.5 | 5.2 | 2.5 |
| | Drawing temperature (°C) | 140 | 140 | 140 | 140 | 140 | 140 | 140 | 140 | 100 | 100 | 100 | 140 |
| | Drawing rate (mm/min) | 100 | 100 | 100 | 100 | 100 | 100 | 100 | 140 | 100 | 100 | 100 | 100 |
| | Relaxation ratio (%) (cooling process) | 0.5 | 0.5 | 0.5 | 0.5 | 1.0 | 0.5 | 0.5 | 0.5 | 0.5 | 0.5 | 0.5 | 0.5 |
| | Heat set temperature (°C) | — | — | — | — | — | — | — | — | — | — | — | 140 |
| | Heat set time (min) | — | — | — | — | — | — | — | — | — | — | — | 5 |
| | Post-drawing film thickness (μm) | 25 | 25 | 25 | 25 | 25 | 25 | 20 | 25 | 25 | 25 | 25 | 25 |
| | Craze area ratio (%) | 0.3 | 0.5 | 0.2 | 0.7 | 0.9 | 0.1 | 0.2 | 0.2 | 0.5 | 0.9 | 1.2 | 0.3 |
| | Flatness | A | A | A | A | B | A | A | A | A | B | A | A |
| SAXS | Ion cluster size in membrane surface direction (nm) | 3.08 | 2.98 | 3.25 | 2.87 | 2.84 | 3.20 | 3.18 | 3.04 | 2.97 | 2.80 | 2.82 | 3.02 |
| | Ion cluster size in extra-membrane-surface direction (nm) | 3.41 | 3.50 | 3.35 | 3.49 | 3.58 | 3.46 | 3.47 | 3.39 | 3.49 | 3.47 | 3.53 | 3.44 |
| | Ion cluster size ratio | 1.11 | 1.17 | 1.03 | 1.22 | 1.26 | 1.08 | 1.09 | 1.12 | 1.18 | 1.24 | 1.25 | 1.14 |
| | Intra-membrane-surface orientation parameter | 0.01 | 0.01 | 0.35 | 0.10 | 0.01 | 0.01 | 0.01 | 0.01 | 0.01 | 0.15 | 0.01 | 0.10 |
| | Extra-membrane-surface orientation parameter | 0.29 | 0.37 | 0.20 | 0.40 | 0.42 | 0.24 | 0.24 | 0.30 | 0.37 | 0.48 | 0.47 | 0.28 |
| | Long period of crystals (nm) | 24.5 | 33.8 | 16.8 | 44.8 | — | 19.1 | 19.5 | 24.8 | 32.5 | — | — | 44.8 |
| | Peak intensity of long period of crystals | 0.37 | 0.15 | 0.49 | 0.03 | — | 0.46 | 0.45 | 0.38 | 0.09 | — | — | 0.15 |
| Relative dimension in 2M sulfuric acid | X direction (%) | 98.1 | 98.8 | 99.1 | 99.0 | 99.1 | 93.5 | 98.4 | 98.0 | 98.8 | 99.3 | 98.9 | 99.0 |
| | Y direction (%) | 98.0 | 98.9 | 102.3 | 98.8 | 99.2 | 98.4 | 98.5 | 98.0 | 98.8 | 98.9 | 98.8 | 98.8 |
| Relative dimension in distilled water | X direction (%) | 96.1 | 95.8 | 95.3 | 95.2 | 95.1 | 97.1 | 97.1 | 96.0 | 95.9 | 95.5 | 95.1 | 96.0 |
| | Y direction (%) | 95.9 | 95.7 | 106.5 | 95.6 | 95.2 | 97.2 | 97.0 | 96.1 | 95.8 | 95.9 | 94.9 | 95.8 |
| | Z direction (%) | 127.2 | 128.5 | 119.7 | 129.1 | 129.9 | 126.5 | 126.3 | 151.1 | 127.2 | 129.4 | 129.5 | 126.9 |
| | Puncture strength (kgf/μm) | 0.042 | 0.056 | 0.035 | 0.061 | 0.063 | 0.041 | 0.040 | 0.039 | 0.051 | 0.066 | 0.068 | 0.047 |
| | Anion-exchange compound | — | — | — | — | — | — | — | — | — | — | — | — |
| Redox flow battery evaluation (1) | Self-discharge | A | A | A | A | A | A | A | B | A | A | A | A |
| | Cell resistance (Ωcm²) | 0.54 | 0.56 | 0.52 | 0.57 | 0.57 | 0.53 | 0.51 | 0.53 | 0.56 | 0.58 | 0.59 | 0.57 |
| | Liquid movement (mL) | 1.5 | 0.9 | 1.8 | 0.7 | 0.5 | 1.7 | 1.7 | 1.4 | 0.9 | 0.4 | 0.3 | 0.7 |
| | Deflection of membrane | A | A | A | A | B | A | A | B | A | A | A | A |
| | Crack in membrane | A | A | A | A | B | A | A | A | A | B | B | A |
| | Current efficiency (%) | 96.8 | 97.0 | 96.2 | 97.1 | 97.3 | 96.6 | 96.5 | 94.9 | 96.9 | 97.6 | 97.8 | 97.4 |

TABLE 2

| | | Example 13 | Example 14 | Example 15 | Example 16 | Example 17 | Example 18 | Example 19 | Example 20 | Example 21 | Comp. Ex. 1 | Comp. Ex. 2 | Comp. Ex. 3 | Comp. Ex. 4 |
|---|---|---|---|---|---|---|---|---|---|---|---|---|---|---|
| Raw material membrane | Polymer structure | P1 | P2 | P2 | P1 | P1 | P1 | P1 | P1 | P1 | P1 | P1 | P1 | P2 |
| | EW | 950 | 1100 | 1100 | 950 | 950 | 750 | 750 | 750 | 950 | 750 | 750 | 950 | 1100 |
| | Thickness (μm) | 210 | 200 | 420 | 210 | 210 | 210 | 210 | 210 | 210 | 25 | 100 | 400 | 200 |
| Drawing | Draw ratio X-axis direction | 2.9 | 3.2 | 5.2 | 2.9 | 2.9 | 2.9 | 2.9 | 2.9 | 2.9 | 1.0 | 2.0 | 4.0 | 3.2 |
| | Y-axis direction | 2.9 | 2.5 | 5.2 | 2.9 | 2.9 | 2.9 | 2.9 | 2.9 | 2.9 | 1.0 | 2.0 | 4.0 | 2.5 |
| | Drawing temperature (°C) | 140 | 100 | 100 | 140 | 140 | 140 | 140 | 140 | 140 | — | 140 | 140 | 100 |
| | Drawing rate (mm/min) | 100 | 100 | 100 | 100 | 100 | 100 | 100 | 100 | 100 | — | 100 | 100 | 100 |
| | Relaxation ratio (%) (cooling process) | 1.0 | 0.5 | 0.5 | 0.5 | 0.2 | 1.0 | 1.0 | 1.0 | 0.0 | 0.0 | 0.0 | 0.0 | 0.0 |
| | Heat set temperature (°C) | 140 | 100 | 100 | 140 | 140 | 140 | 140 | 140 | 140 | — | — | — | — |
| | Heat set time (min) | 5 | 5 | 5 | 5 | 5 | 5 | 5 | 5 | 5 | — | — | — | — |
| | Post-drawing film thickness (μm) | 25 | 25 | 15 | 25 | 25 | 25 | 25 | 25 | 25 | 25 | 25 | 25 | 25 |
| | Craze area ratio (%) | 0.3 | 0.3 | 0.7 | 0.7 | 1.2 | 0.3 | 0.3 | 0.3 | 0.5 | 0.8 | 2.1 | 8.9 | 2.5 |
| | Flatness | A | A | A | B | B | A | A | A | A | A | D | D | D |
| SAXS | Ion cluster size in membrane surface direction (nm) | 3.05 | 2.80 | 2.75 | 3.00 | 2.97 | 3.02 | 3.02 | 3.02 | 3.03 | 3.28 | 3.05 | 2.75 | 2.81 |
| | Ion cluster size in extra-membrane-surface direction (nm) | 3.45 | 3.47 | 3.55 | 3.48 | 3.53 | 3.47 | 3.47 | 3.47 | 3.46 | 3.30 | 3.35 | 3.62 | 3.48 |
| | Ion cluster size ratio | 1.13 | 1.24 | 1.29 | 1.16 | 1.19 | 1.15 | 1.15 | 1.15 | 1.14 | 1.01 | 1.10 | 1.32 | 1.24 |
| | Intra-membrane-surface orientation parameter | 0.01 | 0.15 | 0.01 | 0.01 | 0.01 | 0.01 | 0.01 | 0.01 | 0.01 | 0.01 | 0.01 | 0.01 | 0.15 |
| | Extra-membrane-surface orientation parameter | 0.29 | 0.30 | 0.48 | 0.31 | 0.35 | 0.29 | 0.29 | 0.29 | 0.31 | 0.01 | 0.30 | 0.53 | 0.45 |
| | Long period of crystals (nm) | — | — | — | — | — | — | — | — | — | 11.5 | 24.9 | — | — |
| | Peak intensity of long period of crystals | — | — | — | — | — | — | — | — | — | 1.32 | 0.39 | — | — |
| Relative dimension in 2M sulfuric acid | X direction (%) | 98.7 | 99.0 | 98.1 | 98.5 | 98.4 | 98.1 | 98.2 | 98.3 | 98.6 | 104.5 | 98.0 | 99.8 | 99.4 |
| | Y direction (%) | 98.6 | 98.9 | 97.9 | 98.3 | 98.1 | 97.9 | 98.0 | 98.0 | 98.6 | 104.6 | 98.1 | 99.7 | 99.0 |
| Relative dimension in distilled water | X direction (%) | 96.0 | 96.0 | 95.9 | 95.9 | 95.7 | 95.9 | 96.0 | 96.1 | 95.9 | 110.5 | 96.0 | 94.9 | 95.4 |
| | Y direction (%) | 96.1 | 96.1 | 952 | 95.8 | 95.8 | 96.0 | 96.1 | 96.0 | 96.1 | 110.9 | 95.8 | 95.1 | 96.0 |
| | Z direction (%) | 127.1 | 126.4 | 128.8 | 127.9 | 129.8 | 150.8 | 149.2 | 148.9 | 127.3 | 110.8 | 149.7 | 130.2 | 129.6 |
| | Puncture strength (kgf/μm) | 0.046 | 0.044 | 0.059 | 0.048 | 0.050 | 0.037 | 0.038 | 0.037 | 0.047 | 0.018 | 0.015 | 0.035 | 0.028 |
| | Anion-exchange compound | — | — | — | — | — | — | Polyvinyl pyridine | Dodecyl trimethyl-ammonium | — | — | — | — | — |
| Redox flow battery evaluation (1) | Self-discharge | A | A | B | A | A | B | A | A | A | D | D | C | C |
| | Cell resistance (Ωcm²) | 0.57 | 0.58 | 0.49 | 0.55 | 0.56 | 0.51 | 0.55 | 0.57 | 0.58 | 0.50 | 0.55 | 0.61 | 0.57 |
| | Liquid movement (mL) | 0.5 | 0.4 | 1.5 | 1.2 | 1.0 | 1.0 | 0.7 | 0.8 | 0.6 | 3.8 | 1.0 | 0.3 | 0.4 |
| | Deflection of membrane | B | A | A | B | B | B | B | B | B | C | D | D | D |
| | Crack in membrane | A | A | A | A | A | A | A | A | A | A | A | D | D |
| | Current efficiency (%) | 97.3 | 97.6 | 95.2 | 97.2 | 973 | 95.7 | 99.0 | 98.5 | 97.5 | 95.1 | — | — | — |

Example 22

<Preparation of Carbon Foam>

Figure 2:
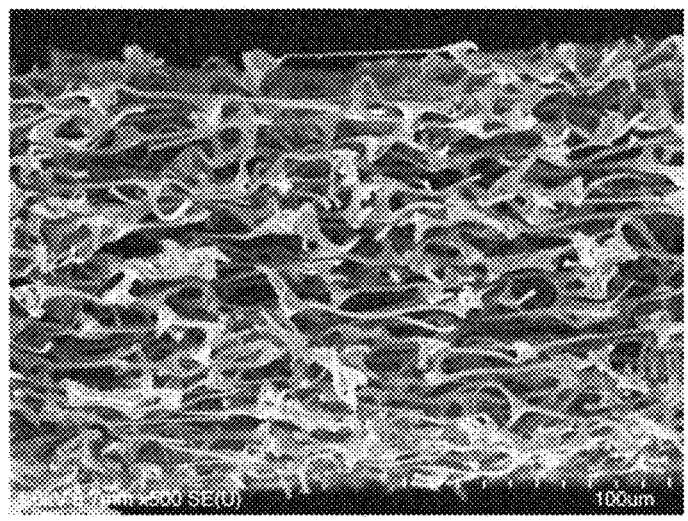
FIG. 2 shows a SEM image of a carbon foam obtained in Example 12.
Figure 2:
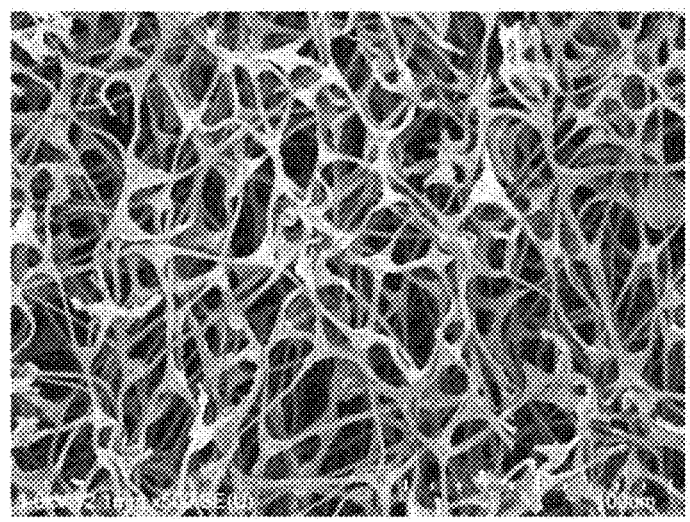

A melamine resin foam (dimension: 400 mm×400 mm×40 mm) was provided as a material of a carbon foam and introduced into a heat treatment furnace with a compressive load of 280 Pa applied to the foam by placing a graphite plate (dimension: 400 mm×400 mm×16 mm) thereon. Subsequently, the inside of the furnace was degassed under reduced pressure through a vacuum pump to adjust the degree of vacuum in the furnace to less than 1 Pa. Subsequently, nitrogen gas was supplied into the furnace at a flow rate of 2 L/min with the furnace degassed under reduced pressure, while the internal temperature of the furnace was elevated to 400° C. at a rate of 2.5° C./min and from 400° C. to 800° C. at a rate of 5° C./rain. The degree of reduced pressure in the furnace at the time when the internal temperature of the furnace reached 800° C. was approximately 700 Pa. At the time when the internal temperature of the furnace reached 800° C., the supply of nitrogen gas was terminated, and the temperature was elevated to a heat treatment temperature of 2000° C. at a temperature elevation rate of 5° C. and kept for 2 hours for the carbonization of the melamine resin foam. The degree of reduced pressure in the furnace at the time when the internal temperature of the furnace reached 2000° C. was less than 10 Pa. Then, the internal temperature of the furnace was lowered to room temperature. Then, the vacuum pump was stopped, and the carbonized melamine resin foam was taken out of the furnace. Subsequently, the obtained carbon foam was heat-treated at 600° C. for 2 hours under a stream of dry air to obtain a carbon foam having an oxidized surface. The flow rate of the stream of dry air was 1 L/min. In this way, the carbon foam of Example 22 was prepared. The obtained carbon foam was observed under SEM and was thereby able to be confirmed to have linear portions and node portions connecting the linear portions and have a structure having a three-dimensionally continuous carbon moiety. FIG. 2 shows the SEM image of the carbon foam obtained in Example 22. FIG. 2(a) shows the SEM image of the cross section of the carbon foam, and FIG. 2(b) shows the SEM image of the surface of the carbon foam.

<Measurement of Average Fiber Diameter>

The average fiber diameter was determined by analyzing a scanning electron microscope (SEM) image of the surface of an arbitrary portion of the obtained carbon foam at a magnification of ×10,000. Supposing that the fibrous carbon constituting the observed carbon foam had a round cross-sectional shape, the thickness of the fibrous carbon was regarded as a fiber diameter. A number-average value of fiber diameters measured at arbitrary 20 locations was determined as an average fiber diameter.

<Structural Analysis by X-Ray CT>

The carbon foam was structurally analyzed by X-ray CT. Specifically, in order to facilitate taking X-ray images, electroless copper plating was performed. Then, a test piece was collected, and the collected test piece was structurally analyzed using a high-resolution 3D X-ray microscope "nano3DX" (product name, manufactured by Rigaku Corp.). Specific electroless plating conditions and X-ray CT analysis conditions are as follows.

(Electroless Plating Conditions)

A sample was dipped in "OPC CONDICLEAN MA" (product name, manufactured by Okuno Chemical Industries Co., Ltd.; diluted into a concentration of 100 mL/L with distilled water) at 70° C. for 5 minutes and then washed with distilled water for 1 minute. Subsequently, the sample was dipped in "OPC PREDIP 49L" (product name, manufactured by Okuno Chemical Industries Co., Ltd.; diluted into a concentration of 10 mL/L with distilled water and supplemented with 1.5 mL/L of 98% by mass of sulfuric acid) at 70° C. for 2 minutes and then washed with distilled water for 1 minute. Subsequently, the sample was dipped in a 1:1 (volume ratio) mixed solution of "OPC INDUCER 50AM" (product name, manufactured by Okuno Chemical Industries Co., Ltd.; diluted into a concentration of 100 mL/L with distilled water) and "OPC INDUCER 50CM" (product name, manufactured by Okuno Chemical Industries Co., Ltd.; diluted into a concentration of 100 mL/L with distilled water) at 45° C. for 5 minutes and then washed with distilled water for 1 minute. Subsequently, the sample was dipped in "OPC-150 CRYSTER MU" (product name, manufactured by Okuno Chemical Industries Co., Ltd.; diluted into a concentration of 150 mL/L with distilled water) at room temperature for 5 minutes and then washed with distilled water for 1 minute. Subsequently, the sample was dipped in "OPC-BSM" (product name, manufactured by Okuno Chemical Industries Co., Ltd.; diluted into a concentration of 125 mL/L with distilled water) at room temperature for 5 minutes. Subsequently, the sample was dipped in a 1:1 mixed solution of "Chemical Copper 500A" (product name, manufactured by Okuno Chemical Industries Co., Ltd.; diluted into a concentration of 250 mL/L with distilled water) and "Chemical Copper 500B" (product name, manufactured by Okuno Chemical Industries Co., Ltd.; diluted into a concentration of 250 mL/L with distilled water) at room temperature for 10 minutes and then washed with distilled water for 5 minutes. Then, the sample was dried in vacuum at 90° C. for 12 hours to dry off moisture.

(X-Ray Conditions)
X-ray target: Cu
X-ray tube voltage: 40 kV
X-ray tube current: 30 mA
(Photographing Conditions)
Projection number: 1500 images
Angle of rotation: 180°
Exposure time: 20 seconds/image
Spatial resolution: 0.54 μm/pixel
(X-Ray CT Analysis Conditions)

The obtained three-dimensional image was processed at one adjacent pixel through a median filter and binarized using Otsu's algorithm. Subsequently, 2.16 μm or smaller lines were removed as noise using software "Simpleware Centerline editor (Ver. 7)" (product name, manufactured by JSOL Corp.) with a default set value. Then, lines and nodes in a 300 μm×300 μm×300 μm field of view of measurement were detected to form an image. From the image, the respective numbers of node portions and linear portions were detected, and ratio R ($N_1/N_m$) and the density of the node portions ($N_n/mm^3$) were calculated.

Figure 3:
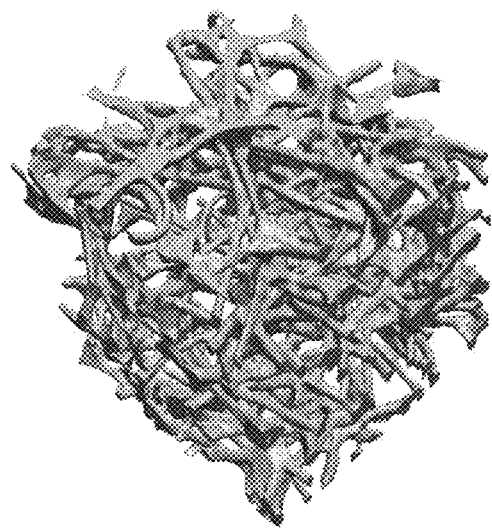
FIG. 3 shows a X-ray CT analysis image of the carbon foam obtained in Example 12.
Figure 4:
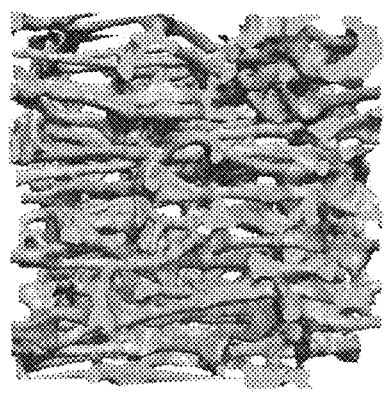
FIG. 4 shows a X-ray CT analysis image of the carbon foam obtained in Example 12.
Figure 5:
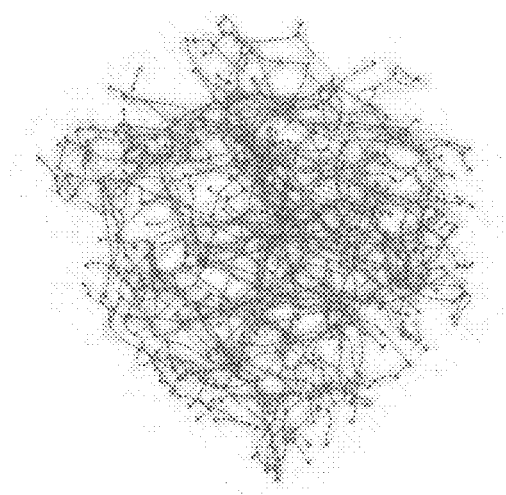
FIG. 5 shows an image after image processing by which the X-ray CT analysis image of the carbon foam shown in FIG. 3 was subjected to line and node detection.

FIG. 3 shows the X-ray CT analysis image of the carbon foam obtained in Example 22. FIG. 4 shows the X-ray CT analysis image of the carbon foam obtained in Example 22 with a different angle. FIG. 5 shows the image after the image processing by which the X-ray CT analysis image of the carbon foam shown in FIG. 3 was subjected to line and node detection.

<Redox Flow Battery Evaluation (2)>

In redox flow battery evaluation (2), a cell was used which was constituted by a Viton rubber gasket, a Teflon® flow channel frame, a graphite separator, and a stainless end plate. A 33×30 mm portion opposed to the electrode of the graphite separator was provided with a comb tooth-shaped flow channel parallel to the short side. The rib width, groove width, and groove depth of the flow channel were 1 mm, 1 mm, and 1.5 mm, respectively. The electrolyte membrane used was the membrane prepared in Example 4. The film thickness of the gasket was adjusted such that the compression ratio of the electrode was 70%.

A 50×80 mm cut out piece from the membrane, two 33×30 mm cut out pieces from the carbon foam, and cell constituent members were combined according to a predetermined order and fastened at a predetermined torque using stainless bolts. The assembled cell was connected to an electrolyte solution circulation apparatus constituted by an electrolyte solution tank and a liquid feed pump. 30 ml of a vanadium sulfate solution having a vanadium ion concentration of 1.5 M, a vanadium ion valence of 3.5, a sulfate ion concentration of 4.5 M was added to the electrolyte solution tank and circulated at a flow rate of 100 ml/min. A charge and discharge test was conducted by the constant current method using a potentiostat "VSP" (product name, manufactured by BioLogic SAS). The voltage range was 1.00 to 1.55 V, and the current density was 80 mA/cm². Cell resistance was determined according to the following expression from average voltages Vc and Vd at the time of charge and discharge.

Cell resistance$(\Omega cm^2) = (Vc - Vd)/(2 \times 0.08)$

Current efficiency was determined from the quantity of discharge with respect to the quantity of charge at a current density of 80 mA/cm².

Example 23

A carbon foam was prepared under the same conditions as in Example 22 except that: a melamine resin foam (dimension: 400 mm×400 mm×20 mm) was provided; and a SUS plate having a thickness of 0.6 mm was disposed as a spacer around the sample, sandwiched between graphite plates each having a thickness of 10 mm from above and below, and introduced into a vacuum heat press "KVHC-II" (product name, manufactured by Kitagawa Seiki Co., Ltd.).

Evaluation was conducted under the same conditions as in Example 22.

Example 24

A biaxially drawn electrolyte membrane was prepared in the same way as in Example 9 except that: the thickness of the raw material membrane was 400 µm; and the draw ratios in the X direction and the Y direction were 4.5. Evaluation was conducted under the same conditions as in Example 22 except that the carbon foam was prepared in the same way as in Example 23.

Example 25

A biaxially drawn electrolyte membrane was prepared in the same way as in Example 9 except that: the thickness of the raw material membrane was 420 µm; and the draw ratios in the X direction and the Y direction were 4.8. Evaluation was conducted under the same conditions as in Example 22 except that the carbon foam was prepared in the same way as in Example 23.

Example 26

A biaxially drawn electrolyte membrane was prepared in the same way as in Example 9 except that: the thickness of the raw material membrane was 400 µm; and the draw ratios in the X direction and the Y direction were 5.2. Evaluation was conducted under the same conditions as in Example 22 except that the carbon foam was prepared in the same way as in Example 23.

Example 27

A biaxially drawn electrolyte membrane was prepared in the same way as in Example 9 except that: the thickness of the raw material membrane was 130 µm; and the draw ratios in the X direction and the Y direction were 2.9. Evaluation was conducted under the same conditions as in Example 22 except that the carbon foam was prepared in the same way as in Example 23.

Example 28

Evaluation was conducted under the same conditions as in Example 22 using a biaxially drawn membrane prepared in the same way as in Example 12 and a carbon foam prepared in the same way as in Example 22.

Example 29

Evaluation was conducted under the same conditions as in Example 22 using a biaxially drawn membrane prepared in the same way as in Example 12 and a carbon foam prepared in the same way as in Example 23.

Example 30

A biaxially drawn electrolyte membrane was prepared in the same way as in Example 14 except that: the thickness of the raw material membrane was 400 µm; and the draw ratios in the X direction and the Y direction were 5.2. Evaluation was conducted under the same conditions as in Example 22 except that the carbon foam was prepared in the same way as in Example 23.

Example 31

Evaluation was conducted under the same conditions as in Example 22 except that: the biaxially drawn electrolyte membrane was prepared in the same way as in Example 18; and the carbon foam was prepared in the same way as in Example 23.

Example 32

Evaluation was conducted under the same conditions as in Example 22 except that: the biaxially drawn electrolyte membrane was prepared in the same way as in Example 19; and the carbon foam was prepared in the same way as in Example 23.

TABLE 3

| | | Example 22 | Example 23 | Example 24 | Example 25 | Example 26 | Example 27 | Example 28 | Example 29 | Example 30 | Example 31 | Example 32 |
|---|---|---|---|---|---|---|---|---|---|---|---|---|
| Raw material membrane | Polymer structure | P1 | P1 | P2 | P2 | P2 | P2 | P1 | P1 | P2 | P1 | P1 |
| | EW | 950 | 950 | 1100 | 1100 | 1100 | 1100 | 950 | 950 | 1100 | 750 | 750 |
| | Thickness (μm) | 180 | 180 | 400 | 420 | 400 | 130 | 180 | 180 | 400 | 210 | 210 |
| Drawing | Draw ratio X-axis direction | 2.9 | 2.9 | 4.5 | 4.8 | 5.2 | 2.9 | 2.9 | 2.9 | 5.2 | 2.9 | 2.9 |
| | Y-axis direction | 2.5 | 2.5 | 4.5 | 4.8 | 5.2 | 2.9 | 2.5 | 2.5 | 5.2 | 2.9 | 2.9 |
| | Drawing temperature (°C.) | 140 | 140 | 100 | 100 | 100 | 100 | 140 | 140 | 100 | 140 | 140 |
| | Drawing rate (mm/min) | 100 | 100 | 100 | 100 | 100 | 100 | 100 | 100 | 100 | 100 | 100 |
| | Relaxation ratio (%) (cooling process) | 0.5 | 0.5 | 0.5 | 0.5 | 0.5 | 0.5 | 0.5 | 0.5 | 0.5 | 1.0 | 1.0 |
| | Heat set temperature (°C.) | — | — | — | — | — | — | 140 | 140 | 100 | 140 | 140 |
| | Heat set time (min) | — | — | — | — | — | — | 5 | 5 | 5 | 5 | 5 |
| | Post-drawing film thickness (μm) | 25 | 25 | 20 | 18 | 15 | 15 | 25 | 25 | 15 | 25 | 25 |
| | Craze area ratio (%) | 0.7 | 0.7 | 0.9 | 1.1 | 1.2 | 0.8 | 0.3 | 0.3 | 0.7 | 0.3 | 0.3 |
| | Flatness | A | A | A | A | A | A | A | A | A | A | A |
| SAXS | Ion cluster size in membrane surface direction | 2.87 | 2.87 | 2.86 | 2.86 | 2.85 | 2.87 | 3.02 | 3.02 | 2.90 | 3.02 | 3.02 |
| | Ion cluster size in extra-membrane-surface direction | 3.49 | 3.49 | 3.50 | 3.52 | 3.53 | 3.49 | 3.44 | 3.44 | 3.59 | 3.47 | 3.47 |
| | Ion cluster size ratio | 1.22 | 1.22 | 1.22 | 1.23 | 1.24 | 1.22 | 1.14 | 1.14 | 1.24 | 1.15 | 1.15 |
| | Intra-membrane-surface orientation parameter | 0.10 | 0.10 | 0.01 | 0.01 | 0.01 | 0.01 | 0.10 | 0.10 | 0.01 | 0.01 | 0.01 |
| | Extra-membrane-surface orientation parameter | 0.40 | 0.40 | 0.41 | 0.42 | 0.44 | 0.40 | 0.28 | 0.28 | 0.40 | 0.29 | 0.29 |
| | Long period of crystals (nm) | 44.8 | 44.8 | — | — | — | — | 44.8 | 44.8 | — | — | — |
| | Peak intensity of long period of crystals | 0.03 | 0.03 | — | — | — | — | 0.16 | 0.16 | — | — | — |
| Relative dimension in 2M sulfuric acid | X direction (%) | 99.0 | 99.0 | 98.9 | 98.8 | 98.7 | 99.1 | 99.0 | 99.0 | 98.1 | 98.1 | 98.2 |
| | Y direction (%) | 98.8 | 98.8 | 98.8 | 98.8 | 98.8 | 99.0 | 98.8 | 98.8 | 98.1 | 97.9 | 98.0 |
| Relative dimension in distilled water | X direction (%) | 95.2 | 95.2 | 95.5 | 95.9 | 95.0 | 95.8 | 96.0 | 96.0 | 95.9 | 95.9 | 96.0 |
| | Y direction (%) | 95.6 | 95.6 | 95.8 | 95.9 | 94.8 | 95.7 | 95.8 | 95.8 | 95.9 | 96.0 | 96.1 |
| | Z direction (%) | 129.1 | 129.1 | 1293 | 129.0 | 129.7 | 128.3 | 126.9 | 126.9 | 128.9 | 150.8 | 149.2 |
| Puncture strength (kgf/μm) | | 0.061 | 0.061 | 0.065 | 0.068 | 0.069 | 0.060 | 0.047 | 0.047 | 0.063 | 0.037 | 0.038 |
| Anion-exchange compound | | — | — | — | — | — | — | — | — | — | — | Polyvinyl pyridine |
| Carbon electrode | Average fiber diameter (μm) | 2.0 | 2.0 | 2.0 | 2.0 | 2.0 | 2.0 | 20 | 2.0 | 2.0 | 2.0 | 2.0 |
| | Ratio R (N₁N₂) | 1.48 | 1.47 | 1.47 | 1.47 | 1.47 | 1.47 | 1.48 | 1.47 | 1.47 | 1.47 | 1.47 |
| | Density of node portion (the number of node portions/mm³) | 510,000 | 3,090,000 | 3,090,000 | 3,090,000 | 3,090,000 | 3,090,000 | 510,000 | 3,090,000 | 3,090,000 | 3,090,000 | 3,090,000 |
| Redox flow battery evaluation (2) | Self-discharge | A | A | A | A | A | A | A | A | A | B | A |
| | Cell resistance (Ωcm²) | 0.51 | 0.49 | 0.47 | 0.45 | 0.43 | 0.42 | 0.48 | 0.47 | 0.43 | 0.47 | 0.50 |
| | Liquid movement (mL) | 0.6 | 0.6 | 0.5 | 0.5 | 0.6 | 0.7 | 0.7 | 0.7 | 1.2 | 1.0 | 0.7 |
| | Deflection of membrane | A | A | A | A | A | A | A | A | A | B | B |
| | Crack in membrane | B | B | B | B | B | B | A | A | A | A | A |
| | Current efficiency (%) | 97.2 | 97.2 | 97.8 | 97.6 | 97.4 | 97.0 | 97.4 | 97.4 | 97.4 | 95.7 | 99.0 |

As is evident from the comparison between Examples and Comparative Examples described above, an electrolyte membrane for a redox flow battery that exhibits excellent battery performance with self-discharge suppressed is obtained by setting the relative dimension of the electrolyte membrane by dipping in a 2 M aqueous sulfuric acid solution or the relative dimension of the electrolyte membrane by dipping in distilled water to a predetermined range.

The present application is based on the Japanese patent applications filed on Mar. 8, 2019 (Japanese Patent Application No. 2019-042876) and on Sep. 13, 2019 (Japanese Patent Application No. 2019-167421), the contents of which are incorporated herein by reference in their entirety.

The invention claimed is:

1. An electrolyte membrane for a redox flow battery, comprising a perfluorocarbon polymer having an ion-exchange group, wherein
    the perfluorocarbon polymer has equivalent weight EW of the ion-exchange group of 600 g/eq or more and 2000 g/eq or less,
    a craze area ratio of the electrolyte membrane is 1.5% or less, and
    a relative dimension of the electrolyte membrane in at least one of a X direction and a Y direction is 80% or more and less than 100% in the following relative dimension by dipping in 2 M aqueous sulfuric acid solution:

<relative dimension by dipping in 2 M aqueous sulfuric acid solution>
    an electrolyte membrane for testing having a water content of 1% or less is prepared; the electrolyte membrane for testing is dipped in a 2 M aqueous sulfuric acid solution at 25° C. for 30 minutes; and ratios of change in dimension in a X direction on a surface of the electrolyte membrane for testing and a Y direction orthogonal to the X direction are calculated according to the following expression:

Relative dimension (%)={(Dimension in a specific direction after the dipping)/(Dimension in the specific direction before the dipping)}×100.

2. An electrolyte membrane for a redox flow battery, comprising a perfluorocarbon polymer having an ion-exchange group, wherein
    the perfluorocarbon polymer has equivalent weight EW of the ion-exchange group of 600 g/eq or more and 2000 g/eq or less,
    a craze area ratio of the electrolyte membrane is 1.5% or less, and
    a relative dimension of the electrolyte membrane in at least one of a X direction and a Y direction is 80% or more and less than 100%, and a relative dimension thereof in a Z direction is 115% or more, in the following relative dimension by dipping in distilled water:

<relative dimension by dipping in distilled water>
    an electrolyte membrane for testing having a water content of 1% or less is prepared; the electrolyte membrane for testing is dipped in distilled water at 25° C. for 30 minutes; and ratios of change in dimension in a X direction on a surface of the electrolyte membrane for testing, a Y direction orthogonal to the X direction, and a Z direction orthogonal to the X direction and the Y direction are calculated:

Relative dimension (%)={(Dimension in a specific direction after the dipping)/(Dimension in the specific direction before the dipping)}×100.

3. The electrolyte membrane according to claim 2, wherein the perfluorocarbon polymer has a structure represented by the following formula (1):

$$-[CF_2-CX^1X^2]_a-[CF_2-CF(-O-(CF_2-CF(CF_2X^3))_b-O_c-(CFR^1)_d-(CFR^2)_e-(CF_2)_f-X^4)]_g- \quad (1)$$

wherein $X^1$, $X^2$ and $X^3$ are each independently a halogen atom or a perfluoroalkyl group having 1 to 3 carbon atoms; $X^4$ is a $-COOZ$ group, a $-SO_3Z$ group, a $-PO_3Z_2$ group or a $-PO_3HZ$ group; Z is a hydrogen atom, an alkali metal atom, an alkaline earth metal atom, $NH_4$, $NH_3R^{11}$, $NH_2R^{11}R^{12}$, $NHR^{11}R^{12}R^{13}$, or $NR^{11}R^{12}R^{13}R^{14}$; $R^{11}$, $R^{12}$, $R^{13}$, and $R^{14}$ are each independently an alkyl group or an aryl group; $R^1$ and $R^2$ are each independently a halogen atom, a perfluoroalkyl group having 1 to 10 carbon atoms or a fluorochloroalkyl group having 1 to 10 carbon atoms; a and g are numbers satisfying $0 \le a < 1$, $0 < g \le 1$, and $a+g=1$; b is an integer of 0 to 8; c is 0 or 1; and d, e and f are each independently an integer of 0 to 6 provided that d, e and f are not 0 at the same time.

4. The electrolyte membrane according to claim 2, wherein the perfluorocarbon polymer has a structure represented by the following formula (2):

$$[CF_2CF_2]_a-[CF_2-CF(-O-(CF_2)_m-SO_3H)]_g- \quad (2)$$

wherein a and g are numbers satisfying $0 \le a < 1$, $0 < g \le 1$, and $a+g=1$; and m is an integer of 1 to 6.

5. The electrolyte membrane according to claim 2, wherein an ion cluster size of the electrolyte membrane in a direction perpendicular to a membrane surface measured by small-angle X-ray scattering is 3.0 nm or larger.

6. The electrolyte membrane according to claim 2, wherein peak intensity of a long period of crystals measured by small-angle X-ray scattering in the electrolyte membrane is 0.5 or less.

7. The electrolyte membrane according to claim 2, wherein at least one surface of the electrolyte membrane is covered with an anion-exchange compound.

8. The electrolyte membrane according to claim 7, wherein the anion-exchange compound has a tertiary amino group or a quaternary ammonium group.

9. A redox flow battery comprising an electrolyzer, the electrolyzer comprising: a positive electrode cell chamber comprising a positive electrode consisting of a carbon electrode; a negative electrode cell chamber comprising a negative electrode consisting of a carbon electrode; and an electrolyte membrane as a membrane that separates the positive electrode cell chamber and the negative electrode cell chamber, wherein
    the positive electrode cell chamber comprises a positive electrode electrolyte solution comprising an active material,
    the negative electrode cell chamber comprises a negative electrode electrolyte solution comprising an active material, and
    the electrolyte membrane is an electrolyte membrane according to any one of claim 2.

10. The redox flow battery according to claim 9, wherein the positive electrode electrolyte solution and the negative electrode electrolyte solution comprise a vanadium ion.

11. The redox flow battery according to claim 9, wherein
    the carbon electrode has a continuous void,
    the carbon electrode has fibrous carbon, and
    the fibrous carbon has an average fiber diameter of 0.1 to 5.0 μm.

12. The redox flow battery according to claim 11, wherein the carbon electrode has a three-dimensionally continuous carbon structure.

13. The redox flow battery according to claim 11, wherein the carbon electrode is a carbon foam having linear portions and node portions connecting the linear portions.

14. The redox flow battery according to claim 13, wherein the ratio of the number of the linear portions to the number of the node portions in the carbon foam is 1.2 or more and 1.7 or less.

15. The redox flow battery according to claim 13, wherein a density of the node portions in at least a portion of the carbon foam is 15,000 portions/mm$^3$ or more.

16. A method for producing an electrolyte membrane for a redox flow battery, comprising:
   drawing a raw material membrane containing a perfluorocarbon polymer having an ion-exchange group under heating, wherein
   the perfluorocarbon polymer has equivalent weight EW of the ion-exchange group of 600 g/eq or more and 2000 g/eq or less,
   a craze area ratio of the electrolyte membrane is 1.5% or less, and
   a relative dimension of the electrolyte membrane in at least one of a X direction and a Y direction is 80% or more and less than 100%, and a relative dimension thereof in a Z direction is 115% or more, in the following relative dimension by dipping in distilled water:

<relative dimension by dipping in distilled water>
   an electrolyte membrane for testing having a water content of 1% or less is prepared; the electrolyte membrane for testing is dipped in distilled water at 25° C. for 30 minutes; and ratios of change in dimension in a X direction on a surface of the electrolyte membrane for testing, a Y direction orthogonal to the X direction, and a Z direction orthogonal to the X direction and the Y direction are calculated:

Relative dimension (%)={(Dimension in a specific direction after the dipping)/(Dimension in the specific direction before the dipping)}×100.

17. The method for producing an electrolyte membrane according to claim 16, further comprising performing relaxation treatment in a cooling process after the drawing.

18. The method for producing an electrolyte membrane according to claim 17, further comprising performing heat treatment for 1 minute or longer and 30 minutes or shorter under a condition equal to or higher than a glass transition temperature and equal to or lower than a temperature higher by 100° C. than the glass transition temperature with the obtained membrane constrained after the relaxation treatment.

19. The electrolyte membrane according to claim 1, wherein at least one surface of the electrolyte membrane is covered with an anion-exchange compound, and the anion-exchange compound has a tertiary amino group or a quaternary ammonium group.

20. A redox flow battery comprising an electrolyzer, the electrolyzer comprising: a positive electrode cell chamber comprising a positive electrode consisting of a carbon electrode; a negative electrode cell chamber comprising a negative electrode consisting of a carbon electrode; and an electrolyte membrane as a membrane that separates the positive electrode cell chamber and the negative electrode cell chamber,
wherein
   the positive electrode cell chamber comprises a positive electrode electrolyte solution comprising an active material,
   the negative electrode cell chamber comprises a negative electrode electrolyte solution comprising an active material, and
   the electrolyte membrane is an electrolyte membrane according to claim 1,
wherein
   the carbon electrode has a continuous void,
   the carbon electrode has fibrous carbon, and
   the fibrous carbon has an average fiber diameter of 0.1 to 5.0 μm,
   the carbon electrode has a three-dimensionally continuous carbon structure, and
   the carbon electrode is a carbon foam having linear portions and node portions connecting the linear portions.

* * * * *